United States Patent
Nobukiyo et al.

(10) Patent No.: US 10,616,803 B2
(45) Date of Patent: Apr. 7, 2020

(54) RADIO BASE STATION, PACKET TRANSMISSION APPARATUS, WIRELESS TERMINAL, CONTROL METHOD, AND PROGRAM

(71) Applicant: NEC Corporation, Minato-ku, Tokyo (JP)

(72) Inventors: Takahiro Nobukiyo, Tokyo (JP); Takamichi Inoue, Tokyo (JP); Daisuke Ohta, Tokyo (JP); Toru Osuga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 66 days.

(21) Appl. No.: 15/519,864

(22) PCT Filed: Oct. 30, 2015

(86) PCT No.: PCT/JP2015/080807
§ 371 (c)(1),
(2) Date: Apr. 18, 2017

(87) PCT Pub. No.: WO2016/068316
PCT Pub. Date: May 6, 2016

(65) Prior Publication Data
US 2017/0245178 A1 Aug. 24, 2017

(30) Foreign Application Priority Data
Oct. 31, 2014 (JP) .................... 2014-222443

(51) Int. Cl.
*H04L 12/863* (2013.01)
*H04W 28/14* (2009.01)
(Continued)

(52) U.S. Cl.
CPC .......... *H04W 28/14* (2013.01); *H04L 47/245* (2013.01); *H04L 47/34* (2013.01); *H04L 47/62* (2013.01);
(Continued)

(58) Field of Classification Search
CPC ..................... H04W 28/14; H04L 47/245
(Continued)

(56) References Cited

U.S. PATENT DOCUMENTS 5,910,955 A 6/1999 Nishimura et al.
6,404,772 B1 6/2002 Beach et al.
(Continued)

FOREIGN PATENT DOCUMENTS

EP 1411685 A2 4/2004
EP 2315466 A1 4/2011
(Continued)

OTHER PUBLICATIONS

Russian Office Action for RU Application No. 2017118579 dated May 30, 2018 with English Translation.
(Continued)

*Primary Examiner* — Angel T Brockman

(57) ABSTRACT

Provided is a radio base station, etc. that realize transmission control in view of QoE. According to a first aspect of the present invention, there is provided a radio base station that receives a packet(s) transmitted from a packet transmission apparatus via a network and transmits the received packet(s) to a wireless terminal(s), the radio base station including: acquisition means that acquires a packet type(s) or a packet identifier(s) set in the packet(s) by the packet transmission apparatus; and control means that performs transmission control to change a transmission order of the packet(s) based on the packet type(s) or the packet identifier(s).

10 Claims, 28 Drawing Sheets

(51) Int. Cl.
*H04W 72/10* (2009.01)
*H04L 12/851* (2013.01)
*H04W 80/06* (2009.01)
*H04L 12/801* (2013.01)
*H04W 28/02* (2009.01)

(52) U.S. Cl.
CPC .......... *H04W 72/10* (2013.01); *H04W 80/06* (2013.01); *H04W 28/0268* (2013.01); *H04W 28/0273* (2013.01)

(58) Field of Classification Search
USPC ........................................... 370/230
See application file for complete search history.

(56) References Cited

U.S. PATENT DOCUMENTS

| | | | |
|---|---|---|---|
| 6,640,248 | B1 | 10/2003 | Jorgensen |
| 7,177,274 | B2* | 2/2007 | Van Der Zee .......... H04L 47/10 370/230 |
| 7,330,918 | B2* | 2/2008 | Yamamoto .............. H04L 47/24 370/229 |
| 2002/0004842 | A1* | 1/2002 | Ghose ................... H04L 1/1809 709/235 |
| 2002/0006111 | A1* | 1/2002 | Akita ................... H04B 10/272 370/235 |
| 2008/0175263 | A1 | 7/2008 | Chen et al. |
| 2009/0141712 | A1 | 6/2009 | Maeno |
| 2010/0296395 | A1* | 11/2010 | Fukuda ................... H04L 47/10 370/230 |
| 2011/0292895 | A1 | 12/2011 | Wager et al. |
| 2011/0310797 | A1 | 12/2011 | Kobayashi et al. |

FOREIGN PATENT DOCUMENTS

| | | |
|---|---|---|
| EP | 2677827 A1 | 12/2013 |
| JP | H10-262075 A | 9/1998 |
| JP | 2005-197988 A | 7/2005 |
| JP | 2006-115528 A | 4/2006 |
| RU | 2009131750 | 2/2011 |
| WO | 02/11476 A1 | 2/2002 |
| WO | 2013/112084 A1 | 8/2013 |

OTHER PUBLICATIONS

3rd Generation Partnership Project; Technical Specification Group Services and System Aspects; Policy and charging control architecture (Release 11), 3GPP TS 23.203 V11.13.0 (Mar. 2014).

3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401 V12.5.0 (Jun. 2014).

RFC: 793 Transmission Control Protocol DARPA Internet Program Protocol Specification Sep. 1981, Information Sciences Institute University of Southern California, California.

RFC: 791 Internet Protocol DARPA Internet Program Protocol Specification Sep. 1981, Information Sciences Institute University of Southern California, California.

Yuichi Harada et al., "Adaptive MAC-Frame Receiving-Opportunity Control for VoIP Qos Guarantee", IEICE Technical Report, Sep. 3, 2009, vol. 109, No. 189, pp. 133-138.

International Search Report for PCT Application No. PCT/JP2015/080807, dated Jan. 19, 2016.

Extended European Search Report for EP Application No. EP15855639.9 dated May 14, 2018.

\* cited by examiner

FIG. 15

| PDCP SN | GTP-U SN | PACKET PRIORITY |
|---|---|---|
| 15 | 15 | NON-PRIORITY (INITIAL TRANSMISSION) |
| 16 | 16 | PRIORITY (RETRANSMISSION) |
| 17 | 17 | NON-PRIORITY (INITIAL TRANSMISSION) |

FIG. 27

| QCI | Resource Type | Priority | Packet Delay Budget | Packet Error Loss Rate | Example Services |
|---|---|---|---|---|---|
| 1 | GBR | 2 | 100 ms | $10^{-2}$ | Conversational Voice |
| 2 | GBR | 4 | 150 ms | $10^{-3}$ | Conversational Video (Live Streaming) |
| 3 | GBR | 3 | 50 ms | $10^{-3}$ | Real Time Gaming |
| 4 | GBR | 5 | 300 ms | $10^{-6}$ | Non-Conversational Video (Buffered Streaming) |
| 5 | Non-GBR | 1 | 100 ms | $10^{-6}$ | IMS Signalling |
| 6 | Non-GBR | 6 | 300 ms | $10^{-6}$ | Video (Buffered Streaming) TCP-based (e.g., www, e-mail, chat, ftp, p2p file sharing, progressive video, etc.) |
| 7 | Non-GBR | 7 | 100 ms | $10^{-3}$ | Voice, Video (Live Streaming) Interactive Gaming |
| 8 | Non-GBR | 8 | 300 ms | $10^{-6}$ | Video (Buffered Streaming) TCP-based (e.g., www, e-mail, chat, ftp, p2p file sharing, progressive video, etc.) |
| 9 | Non-GBR | 9 | 300 ms | $10^{-6}$ | Video (Buffered Streaming) TCP-based (e.g., www, e-mail, chat, ftp, p2p file sharing, progressive video, etc.) |

RADIO BASE STATION, PACKET TRANSMISSION APPARATUS, WIRELESS TERMINAL, CONTROL METHOD, AND PROGRAM

REFERENCE TO RELATED APPLICATION

This application is a National Stage Entry of PCT/JP2015/080807 filed on Oct. 30, 2015, which claims priority from Japanese Patent Application 2014-222443 filed on Oct. 31, 2014, the contents of all of which are incorporated herein by reference, in their entirety.

FIELD

The present invention relates to a radio base station, a packet transmission apparatus, a wireless terminal, a control method, and a program.

BACKGROUND

As smartphones and tablet terminals have become widespread, the amount of mobile communication data traffic has greatly increased. As a result, LTE (Long Term Evolution) communication that realizes a higher speed and a larger capacity has also become widespread. In addition, LTE-Advanced (hereinafter, LTE-A) that realizes an even higher speed is being introduced. An LTE/LTE-A network includes a wireless network (E-UTRAN (Evolved Universal Terrestrial Radio Network) and a core network (EPC (Evolved Packet Core)). The E-UTRAN includes a base station(s) and terminals. The EPC includes a P-GW (PDN (Packet data network) Gateway) for establishing connection with an external network such as the Internet and an S-GW (Serving GW) that handles the U-plane (User plane) for user data, for example. In an LTE/LTE-A network, from a viewpoint of improvement of the frequency usage efficiency, a packet switching-over method in which a band is frexibly allocated is used, and voice can be packetized by using VoIP (Voice over IP).

In LTE, nine QCIs (QoS Class Identifiers) are defined as parameters for managing QoS (Quality of Service). The presence or absence of band control (GBR (Guaranteed Bit Rate) or Non-GBR), a priority, a PDB (Packet Delay Budget), a Packet Loss Rate, etc. are defined per QCI. Rules defining which QCI needs to be allocated to which service are set by PCRF (Policy Charging Rule Function) for EPC. The P-GW performs QoS control based on the rules set by the PCRF. In an LTE network, a route (bearer), which is a virtual data path, is set between a P-GW and a wireless terminal per QCI. A scheduler of a radio base station refers to the QCI information and checks the priority of an individual packet to be transmitted to a wireless terminal. In view of the priority, the scheduler determines the order of the transmission of the packet to the wireless terminal and the amount of radio resources to be allocated (NPL 1). The table in FIG. 27 illustrates an example in which the QCIs are defined. In this example, Conversational Voice is defined as a service transmitted through a bearer whose QCI is 1. In addition, Video, TCP-based, etc. are defined as services transmitted through a bearer whose QCI is 8. For example, when a wireless terminal #1 is waiting to receive packet data whose QCI is 1 and a wireless terminal #2 is waiting to receive packet data whose QCI is 8, priority control using the QCIs is performed. In this case, the packets addressed to the wireless terminal #1 waiting for packet data whose priority is higher (QCI=1) are transmitted preferentially.

From the viewpoint of the PDB, if there is not enough wait time for the packets whose QCI is 8, the packets addressed to the wireless terminal #2 may preferentially be transmitted, too.

NPL 1: 3GPP TS23.203 v11.13.0 (2014-03), Policy and charging control architecture, p. 38.

NPL 2: 3GPP TS23.401 v12.5.0 (2014-6) UE-PGW user plane with E-UTRAN, p. 82.

NPL 3: RFC793, TRANSMISSION CONTROL PROTOCOL DARPA INTERNET PROGRAM PROTOCOL SPECIFICATION, September 1981

NPL 4: RFC791, INTERNET PROTOCOL DARPA INTERNET PROGRAM PROTOCOL SPECIFICATION, September 1981

SUMMARY

The disclosures of the above NPLs are incorporated herein by reference thereto. The following analysis has been made from the viewpoint of the present invention.

With the above QCI control in LTE, the priority order among packets having the same QCI cannot be set. As a result, an application such as reproduction of a moving image could be interrupted or stopped. Namely, there is a problem that users' QoE (Quality of Experience) could be deteriorated. This problem will be described with reference to (a) and (b) of FIG. 28.

(a) of FIG. 28 illustrates a relationship between a packet (PDCP (Packet Data Convergence Protocol) packet) 101 in a layer of PDCP, which is a protocol used on the U-Plane in a wireless area between a radio base station(s) and a wireless terminal(s) and a TCP (Transmission Control Protocol) (NPL 3) packet 102. While not illustrated in (a) of FIG. 28, the PDCP packet 101 is a packet obtained by encapsulating the TCP packet 102 with a network layer protocol and PDCP. For example, the TCP packet 102 is encapsulated in the IP (Internet Protocol) (NPL 4) layer (encapsulated into an IP packet), and the IP packet is encapsulated in the PDCP layer (encapsulated into a PDCP packet). While a PDCP packet will hereinafter be described as a packet obtained by encapsulating a TCP packet for convenience of the description of the present invention, the encapsulation in the IP layer (into an IP packet) might be omitted as needed.

In (a) of FIG. 28, "97" in the PDCP packet 101 indicates that the PDCP SN (Sequence Number) is "97". Likewise, "217" in the TCP packet 102 indicates that the TCP SN is "217" (the same holds true in (b) of FIG. 28). (b) of FIG. 28 illustrates a PDCP buffer whose QCI is x (x is any number from 1 to 9). In particular, (b) of FIG. 28 illustrates a state in which a retransmitted TCP packet has arrived at the PDCP buffer. A PDCP buffer is prepared per QCI. In (b) of FIG. 28, as an example, TCP packets 102 that have arrived at the PDCP layer are given PDCP SNs and PDCP headers (encapsulated into PDCP packets) and are next accumulated in the PDCP buffer as PDCP packets 101. However, other cases are possible. For example, packets of an upper layer than PDCP (for example, IP packets) may be accumulated as they are in the PDCP buffer. In such case, when these packets are transmitted from the PDCP buffer also, these packets may be given PDCP SNs and PDCP headers are next transmitted to a different layer as the PDCP packets 101. What type of packet needs to be accumulated in the PDCP buffer (which protocol of packet needs to be accumulated) and the order of the allocation of PDCP SNs and PDCP headers depend on the implementation.

The TCP packets 102 are encapsulated in the order of their arrival at the PDCP layer, are given PDCP SNs, and are buffered (accumulated) as the PDCP packets 101. A radio base station transmits packets indicating the same QCI in the order of the packet accumulation in the PDCP buffer (for example, in the order of the PDCP SNs). Thus, when many packets are accumulated in the buffer, it takes some time for a PDCP packet 101 in which the most recently received TCP packet 102 has been encapsulated (for example, a PDCP packet 1011 in which a TCP packet 1021 has been encapsulated in (b) of FIG. 28) to be transmitted. However, normally, an application using TCP is executed by using packets in the order of the TCP SNs. Thus, when the TCP packet 102 that has arrived at the PDCP buffer most recently is the retransmitted TCP packet 1021 (the packet whose TCP SN is 124) as illustrated in (b) of FIG. 28, the control according to related technology requires much time to retransmit the TCP packet 1021 that has arrived most recently. Consequently, for example, a video application halts its reproduction operation until the transmission of the retransmitted TCP packet 1021 is completed. As described above, since TCP packets (or IP packets in which the TCP packets are encapsulated) are transmitted as PDCP packets from the buffer in the order of the accumulation in the PDCP buffer, there is a problem that TCP packets that need to be transmitted preferentially to users are not transmitted preferentially.

The present invention has been made in view of the above problem, and it is an object of the present invention to provide a radio base station, etc. that realize transmission control in view of QoE.

According to a first aspect of the present invention, there is provided a radio base station that receives a packet(s) transmitted from a packet transmission apparatus via a network and transmits the received packet(s) to a wireless terminal(s), the radio base station including: acquisition means that acquires a packet type(s) or a packet identifier(s) set in the packet(s) by the packet transmission apparatus; and control means that performs transmission control to change a transmission order of the packet(s) based on the packet type(s) or the packet identifier(s).

According to a second aspect of the present invention, there is provided a method of controlling a radio base station that receives a packet(s) transmitted from a packet transmission apparatus via a network and transmits the received packet(s) to a wireless terminal(s), the method including steps of: acquiring a packet type(s) or a packet identifier(s) set in the packet(s) by the packet transmission apparatus from the packet(s); and performing transmission control to change a transmission order of the packet(s) based on the packet type(s) or the packet identifier(s).

According to a third aspect of the present invention, there is provided a program, causing a computer to perform a method of controlling a radio base station that receives a packet(s) transmitted from a packet transmission apparatus via a network and transmits the received packet(s) to a wireless terminal(s), the program causing the computer to perform processing of: acquiring a packet type(s) or a packet identifier(s) set in the packet(s) by the packet transmission apparatus from the packet(s); and performing transmission control to change a transmission order of the packet(s) based on the packet type(s) or the packet identifier(s).

According to a fourth aspect of the present invention, there is provided a wireless terminal, receiving a packet(s) from a radio base station that has received the packet(s) from a packet transmission apparatus, the wireless terminal including: reception means that receives the packet(s) from the radio base station that performs transmission control to change a transmission order of the packet(s) based on a packet type(s) or a packet identifier(s) set in the packet(s) by the packet transmission apparatus; and data configuration means that reconfigures data transmitted from the packet transmission apparatus from the packet(s).

According to the present invention, since a radio base station performs packet transmission control based on a packet type(s) or the like of a packet(s), transmission delay of a packet(s) indicating high priority can be reduced. As a result, the application QoE can be improved.

BRIEF DESCRIPTION OF DRAWINGS

FIG. 15 illustrates a database included in the radio base station according to the third exemplary embodiment.

FIG. 27 illustrates a QCI table.

PREFERRED EMBODIMENTS

Figure 1:
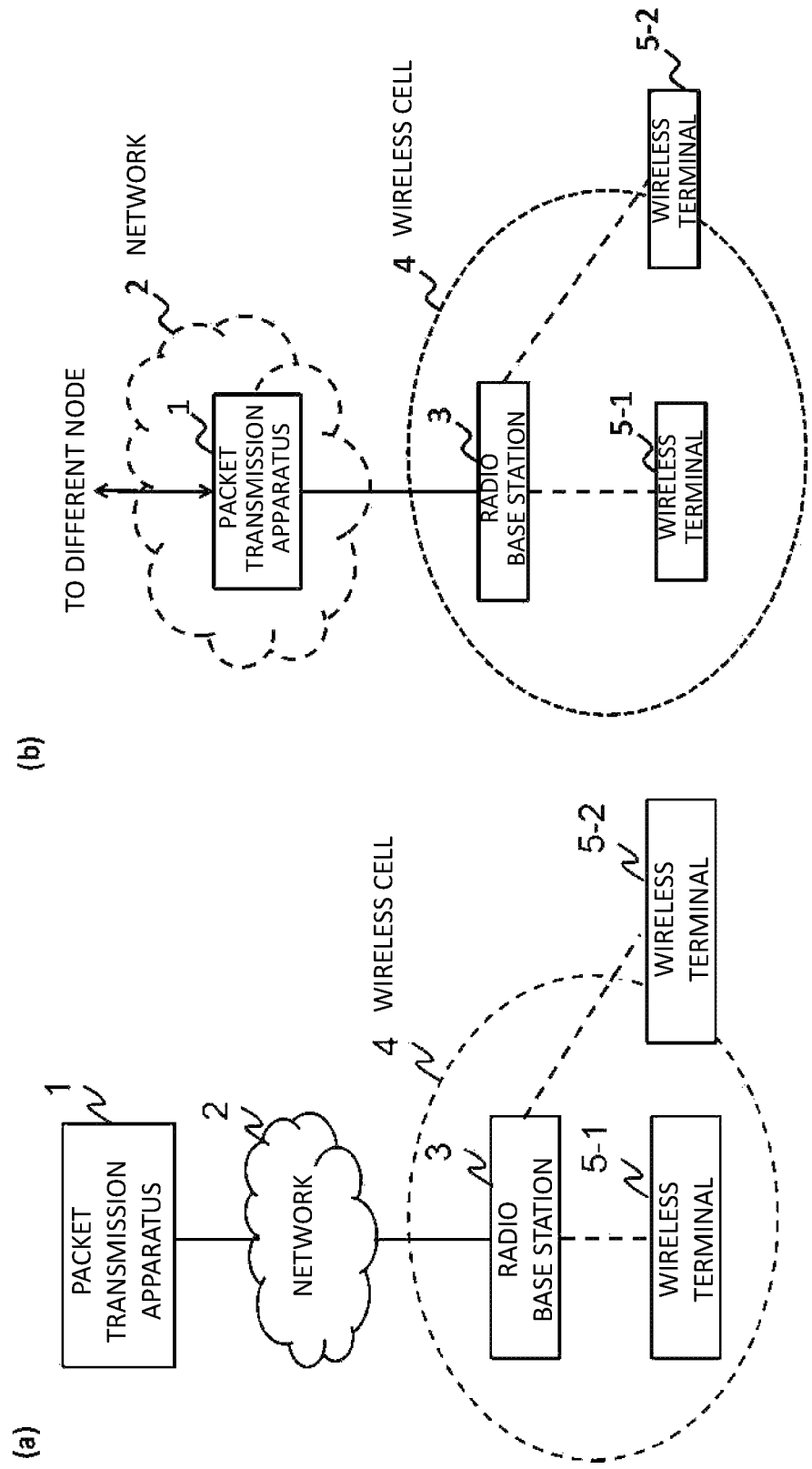
FIG. 1 illustrates configuration examples of a communication system according to a first exemplary embodiment.

Hereinafter, exemplary embodiments according to the present invention will be described in detail with reference to the drawings. In the following drawings, like reference characters refer to like elements, and redundant description will be omitted unless needed for clarification.

First Exemplary Embodiment

[Configuration]

(a) and (b) of FIG. 1 illustrate configuration examples of a communication system according to a first exemplary embodiment of the present invention. At least a part of this communication system includes a wireless communication system. In the present exemplary embodiment, LTE is used as an example of the wireless communication system. Referring to (a) and (b) of FIG. 1, the communication system includes a packet transmission apparatus 1, a network 2, a radio base station 3, a wireless cell 4, and wireless terminals 5-1 and 5-2. The number of components illustrated in (a) and (b) of FIG. 1 is an example. For example, a plurality of radio base stations 3 may be included. Since the present invention can be applied to both the wireless terminals 5-1 and 5-2, when the wireless terminals 5-1 and 5-2 do not need to be distinguished from each other, both the wireless terminals 5-1 and 5-2 will be referred to as the wireless terminals 5.

In (a) of FIG. 1, for example, the packet transmission apparatus 1 may be a wireless terminal other than the wireless terminals 5-1 and 5-2 or may be a content transmission apparatus such as a server that delivers contents to the wireless terminals 5. Alternatively, the packet transmission apparatus 1 may be a relay apparatus arranged inside the network 2 as illustrated in (b) of FIG. 1.

The packet transmission apparatus 1 transmits a packet addressed to a wireless terminal(s) 5 to the wireless terminal(s) 5. There are cases in which the packet transmission apparatus 1 performs this packet transmission to the wireless terminal(s) 5 in response to a request from the wireless terminal(s) 5. When the packet transmission apparatus 1 is a content transmission apparatus, the content transmission apparatus divides content data into packets and transmits these packets to the wireless terminal(s) 5. The content data may be image data, voice data, or the like.

The network 2 is connected to the packet transmission apparatus 1 and the radio base station 3 and can relay a packet(s) transmitted from the packet transmission apparatus 1 to the radio base station 3. The network 2 may include a core network or a wide area network (WAN) such as an IP network. The packet transmission apparatus 1 may be located inside or outside the network 2.

The radio base station 3 manages the wireless cell 4 and wirelessly transmits a packet(s) received from the packet transmission apparatus 1 to the wireless terminal(s) 5 being connected to the radio base station 3 (downlink communication). The communication (uplink communication) from the wireless terminal(s) 5 to the radio base station 3 can also be performed wirelessly.

The wireless cell 4 is a communication area in which connection with the radio base station 3 can be established. The wireless cell 4 is managed by the radio base station 3. While the radio base station 3 manages only one wireless cell 4 in (a) and (b) of FIG. 1, the radio base station 3 may manage a plurality of cells.

The wireless terminals 5 receive a packet(s) transmitted from the packet transmission apparatus 1 via the radio base station 3. In addition, the wireless terminals 5 report CSI (Channel State Information) including, for example, a CQI (Channel Quality Indicator) representing radio quality in accordance with an instruction from the radio base station 3. The CQI is used in scheduling performed in the radio base station.

Figure 2:
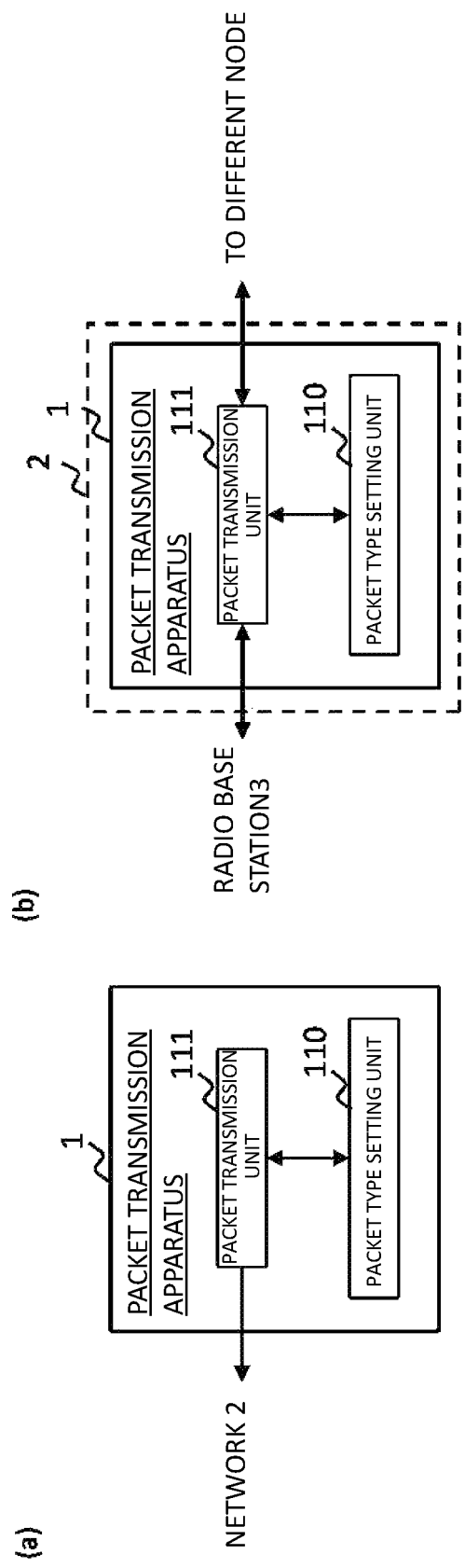
FIG. 2 illustrates block diagrams of configuration examples of a packet transmission apparatus according to the first exemplary embodiment.

(a) and (b) of FIG. 2 illustrate block diagrams of configuration examples of the packet transmission apparatus 1 according to the present exemplary embodiment.

In (a) and (b) of FIG. 2, the packet transmission apparatus 1 includes a packet type setting unit 110 as setting means and a packet transmission unit 111 as transmission means. Among the function blocks included in the packet transmission apparatus 1, (a) and (b) of FIG. 2 illustrate only a few of the constituent elements according to the present exemplary embodiment. Namely, the packet transmission apparatus 1 also includes a function block(s) (not illustrated) for causing the packet transmission apparatus 1 to function as a node that transmits packets to the wireless terminals 5. For example, the packet transmission apparatus 1 has a function of receiving requests from the wireless terminals 5 and a function of previously accumulating packets addressed to the wireless terminals 5 as will be described below. In addition, for example, the packet transmission apparatus 1 may have a function of relaying packets between a different node and the radio base station 3.

The packet type setting unit 110 sets a packet type or a packet identifier in an individual packet addressed to the wireless terminal(s) 5. More specifically, the packet type setting unit 110 allocates a sequence number (SN) to data accumulated in data assumulation means not illustrated, divides the data into packets, and sets a packet type or a packet identifier in an individual packet.

Herein, the packet type is information for identifying a type of the packet. For example, the packet type indicates whether the corresponding packet is an initially transmitted TCP packet or a retransmitted TCP packet. In addition, for example, the packet identifier is a number (a packet identification number) allocated for identification of the corresponding packet. As a more specific example, the packet identifier is a TCP SN allocated to the corresponding packet. The present exemplary embodiment will be described assuming that the packet type indicates whether the packet is an initially transmitted TCP packet or a retransmitted TCP packet and that the packet type setting unit 110 sets the packet type in the corresponding packet. However, a packet identifier may be set in the corresponding packet in place of the packet type, as will be described in a fourth exemplary embodiment.

Various methods may be used to set the packet type in the corresponding packet. For example, as will be described below, the packet type setting unit 110 may write the packet type in an unused area in the IP header of the corresponding packet.

If the packet transmission apparatus 1 is arranged inside a core network, it is desirable that the packet transmission apparatus 1 include a DPI (Deep Packet Inspection) function. This DPI function is a function of reading (inspecting) the payload (data portion) of an individual packet and acquiring information about an upper layer(s) (including a sublayer(s)). This is because, if the packet type is written in an unused area in the IP header of the corresponding packet, processing needs to be performed in the IP layer. If the packet transmission apparatus 1 has a function of setting the packet type in the corresponding packet already, the packet transmission apparatus 1 does not need to have the DPI function to acquire the information about an upper layer(s). For example, a P-GW illustrated in FIG. 3 has a function of terminating the IP layer protocol and is capable of reading and writing the IP header.

Figure 3:
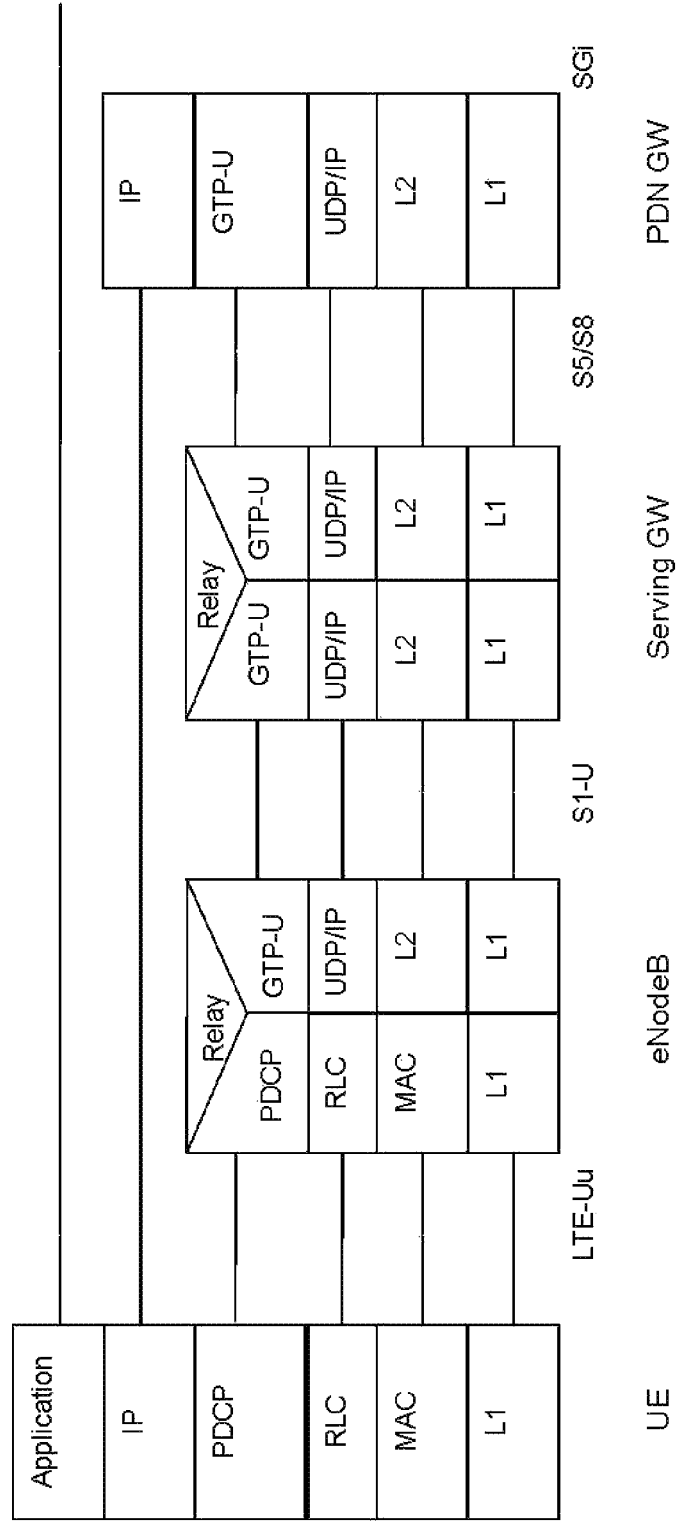
FIG. 3 illustrates a protocol stack between a UE and a P-GW on the U-Plane in the E-UTRAN.

The packet transmission unit 111 notifies the radio base station 3 of the packet type set in the corresponding packet via the network 2. The packet transmission unit 111 may use various methods for notifying the radio base station 3 of the packet type. For example, if the setting of the packet type is performed by writing the packet type in the IP header described below, the packet transmission unit 111 notifies the radio base station 3 of the packet type by transmitting a packet in which the packet type is set to the radio base station 3. When receiving this packet, the radio base station 3 can determine the packet type by reading the IP header of the packet. Alternatively, the packet transmission unit 111 may notify the radio base station 3 of the packet type set in the corresponding packet by using a different packet other than this packet. For example, if the packet transmission apparatus 1 arranged inside a core network notifies the radio base station 3 that does not have the DPI function of the packet type, for this notification, the packet transmission apparatus 1 may use a layer message that can be processed by the radio base station 3. FIG. 3 illustrates a protocol stack between a UE (User Equipment, corresponding to a wireless terminal 5) and a P-GW (an example of the packet transmission apparatus 1) on the User Plane defined in the 3GPP (Third Generation Partnership Project) (NPL 2). In FIG. 3, the eNodeB (Evolved Node B) corresponds to the radio base station 3. Namely, the packet transmission apparatus 1 may use a message in GTP-U (GPRS Tunneling Protocol For User Plane) or a layer lower than GTP-U to notify the radio base station 3 of the packet type.

As will be described below, the radio base station 3 according to the present exemplary embodiment is a radio base station that performs transmission control to move forward the transmission order of a predetermined packet based on the corresponding packet type. In addition, while, in the present exemplary embodiment, the packet type indicates whether the TCP packet is an initially transmitted packet or a retransmitted packet, the present exemplary embodiment is not limited to such example. For example, information used as an example in a different exemplary embodiment may be used, such as information indicating whether or not the corresponding packet is a prefetched packet.

Figure 4:
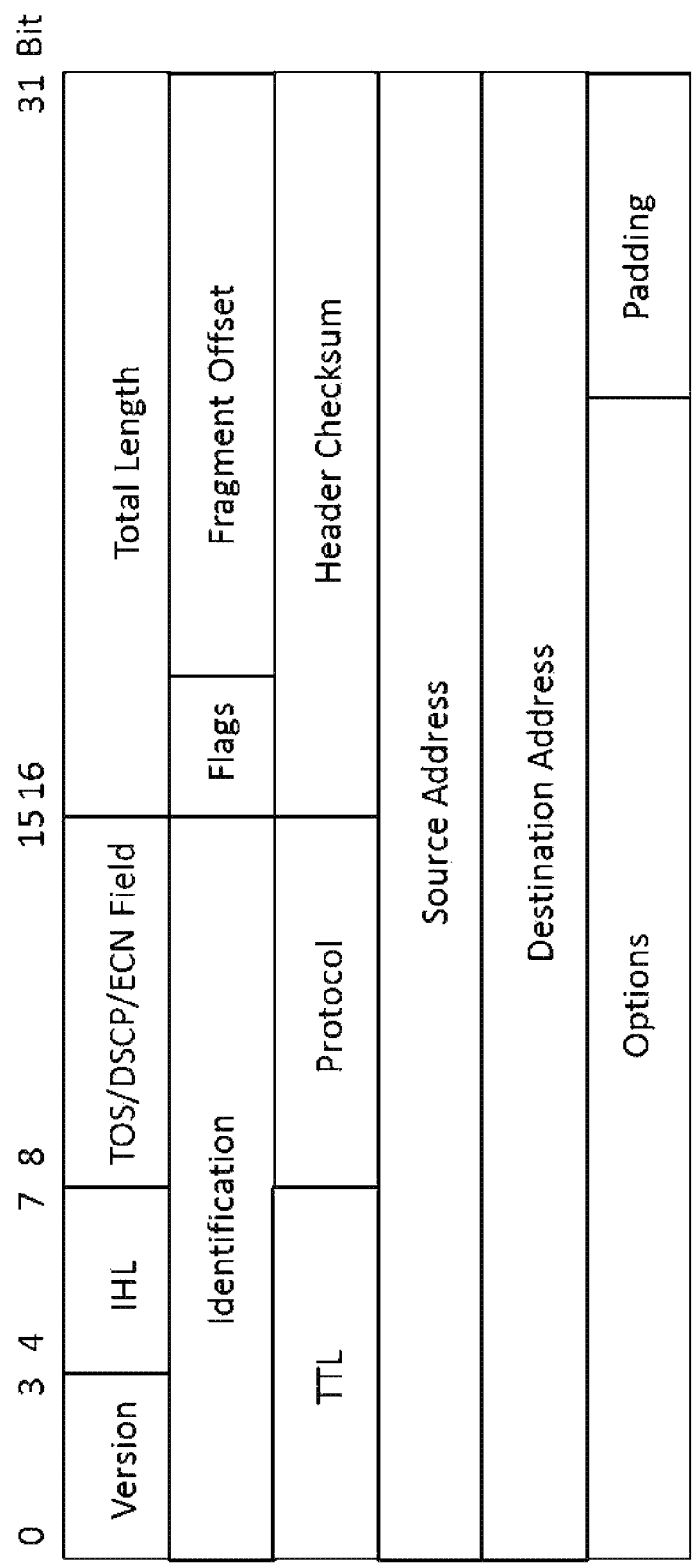
FIG. 4 illustrates a configuration example of an IP header.
Figure 5:
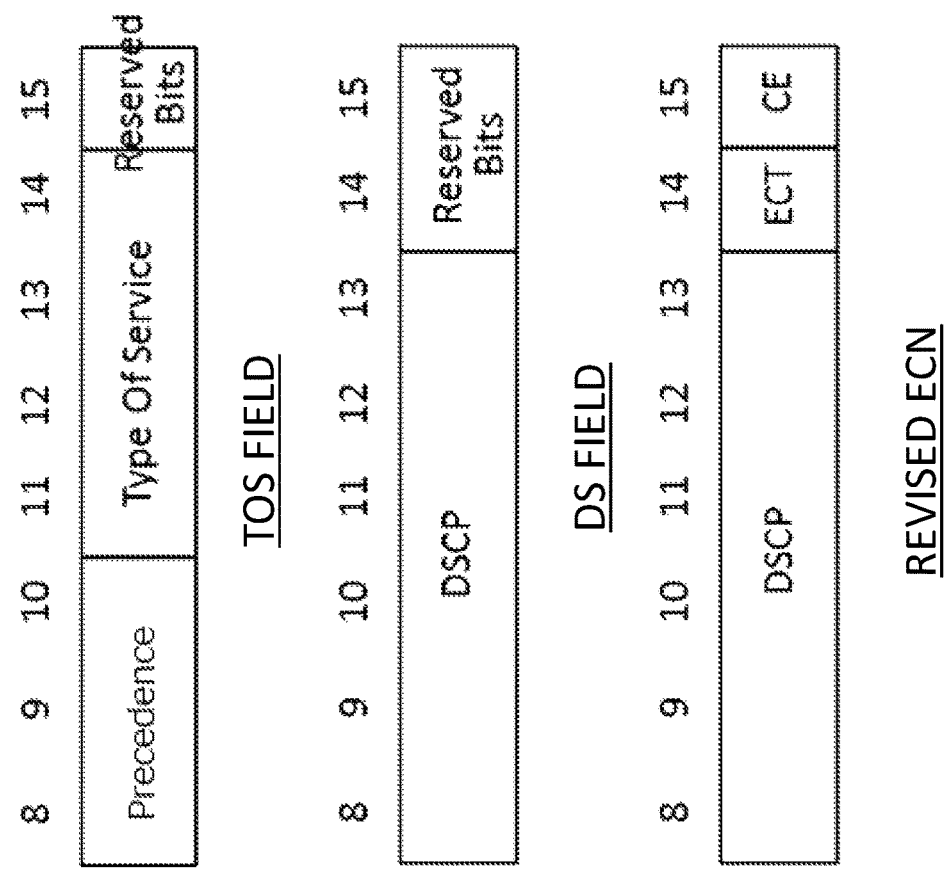
FIG. 5 illustrates a configuration example of a TOS/DSCP/ECN field, which is a part of the IP header.

Next, a configuration of an IP header will be described with reference to FIG. 4. Version represents an IP version. IHL (Internet Header Length) represents the length of the IP header. In a TOS (Type Of Service)/DSCP (Differentiated Services Code Point)/ECN (Explicit Congestion Notification) Field, a TOS field, a DS field, or a revised ECN field illustrated in FIG. 5 is used. Precedence in the TOS field represents priority of the corresponding IP packet. A packet having a larger number in this field is recognized as a more important packet. Reserved Bit(s) is an unused 1-bit area. As does Precedence in the TOS field, DSCP in the DS field and DSCP in the revised ECN field represent priority of the corresponding IP packet. Since more bits are used in DSCP than those in Precedence in the TOS field, the priority of the IP packet can be set more finely. The DS field also includes an unused 2-bit area. In the revised ECN field, an ECT (ECN Capable Transport) code point and a CE (Congestion Experienced) code point are defined. Next, Total Length in the IP header represents the total size of the corresponding IP packet. Identification is an identifier for identification of the corresponding IP packet. Flags are fragmentation state transition information. Fragment Offset is an identifier for indicating which portion of the fragments is included in the corresponding IP packet. TTL represents the lifetime of the corresponding IP packet. Protocol represents a protocol used in the upper layer. Header Checksum is a field for Checksum. Source Address and Destination Address are source and destination IP addresses, respectively. Options is a field in which extension information is set. Normally, this field is not used. Padding is bits used for adjusting the size of the IP header.

In the present exemplary embodiment, the packet type is set by using the Reserved Bits in the DS field. More specifically, when the Reserved Bits in the 14th Bit is 0, the packet is determined to be an initially transmitted TCP packet. When the Reserved Bits in the 14th Bit is 1, the packet is determined to be a retransmitted TCP packet. However, the present invention is not limited to this example. A different field or bit in the IP header may be used, such as the Options field in the IP header or the Reserved Bit in the TOS field.

Figure 6:
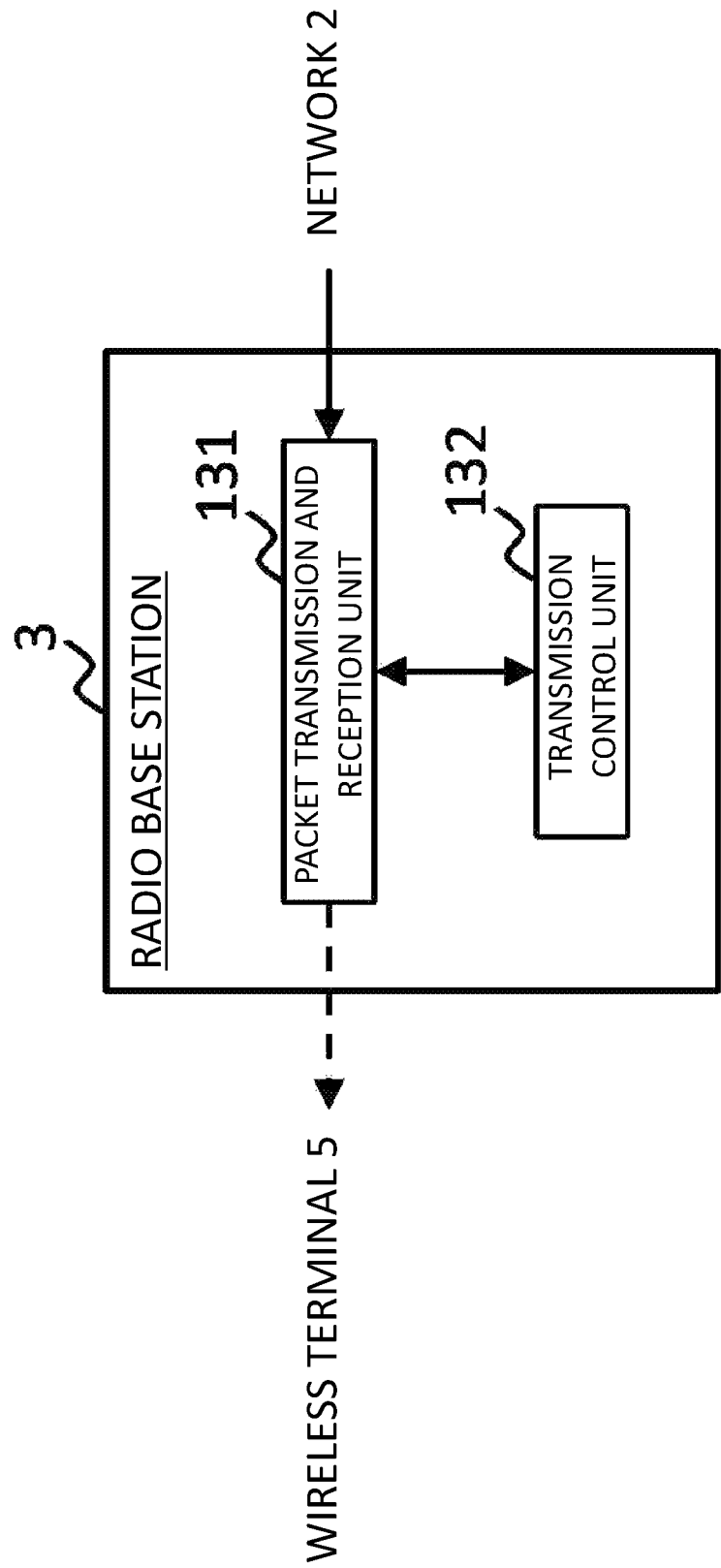
FIG. 6 illustrates a block diagram of a configuration example of a radio base station according to the first exemplary embodiment.

FIG. 6 illustrates a block diagram of a configuration example of the radio base station 3 according to the present exemplary embodiment.

In FIG. 6, the radio base station 3 includes a packet transmission and reception unit 131 as acquisition means and a transmission control unit 132 as control means. In addition, among the function blocks included in the radio base station 3, FIG. 6 illustrates only a few of the constituent elements according to the present exemplary embodiment. Namely, the radio base station 3 also includes a function block(s) (not illustrated) for causing the radio base station 3 to function as a radio base station. For example, the radio base station 3 also includes a function of receiving radio quality information such as a CQI from an individual wireless terminal 5, a scheduler function of allocating radio resources to an individual wireless terminal 5, and a function of transmitting packets accumulated in a buffer to an individual wireless terminal 5. These functions are equivalent to those of a radio base station commonly used in a wireless communication system, and the configurations and operations of these functions are known.

The packet transmission and reception unit 131 acquires the packet type set in a packet by the packet transmission apparatus 1. More specifically, when receiving a packet transmitted via the network 2, the packet transmission and reception unit 131 acquires the packet type of the received packet by reading the header of the received packet, for example. Next, the packet transmission and reception unit 131 encapsulates this packet, gives an SN, and accumulates the packets in a buffer (not illustrated) in the radio base station 3. If the packet type is set in the IP header of the packet, for example, the packet type of the packet is read as follows. Namely, by using a DPI function, the packet transmission and reception unit 131 reads the header of the IP packet including the corresponding TCP packet, namely, the 14th Bit of the IP header (since the first Bit is 0 in FIGS. 4 and 5, the location of the 15th Bit is read). If the read information indicating the packet type is 0, the packet transmission and reception unit 131 determines that the received packet is an initially transmitted TCP packet. If the read information indicating the packet type is 1, the packet transmission and reception unit 131 determines that the received packet is a retransmitted TCP packet. The packet transmission and reception unit 131 determines this retransmitted packet to be a priority packet. The packet transmission and reception unit 131 notifies the transmission control unit 132 of the determination result. The packet type may be read after the corresponding packet is accumulated in the buffer.

Based on the packet type, the transmission control unit 132 performs transmission control to move forward the transmission order of a predetermined packet. In the present exemplary embodiment, buffer control, which is an example of the transmission control to move forward the transmission order of a predetermined packet, will be described. Based on the determination result given by the packet transmission and reception unit 131, the transmission control unit 132 performs buffer control to preferentially transmit the retransmitted TCP packet to the wireless terminal(s). While various methods may be used for this buffer control, in the present exemplary embodiment, the accumulation order of the packets currently accumulated in the buffer is changed so that the retransmitted TCP packet (concerned) is transmitted more quickly.

For example, if the buffer, which is the control target of the transmission control unit 132, is a PDCP buffer in the radio base station 3, the transmission control unit 132 may allocate a PDCP SN and a PDCP header to the corresponding packet in the PDCP buffer. By making necessary changes so that the PDCP SN of the retransmitted TCP packet represents a smaller number, this retransmitted TCP packet can be transmitted from the buffer more quickly.

Next, a scheduler not illustrated determines allocation of radio resources for transmission to the wireless terminal(s) 5 in the accumulation order in which the packets are buffered in the buffer. Next, the radio base station 3 transmits the corresponding packet to the wireless terminal(s) 5. The buffer control may use a method described in an exemplary embodiment other than the present exemplary embodiment. For example, a priority buffer for preferential transmission to the wireless terminal(s) 5 may be arranged in the radio base station 3. In such case, retransmitted packets are accumulated in this priority buffer and are preferentially transmitted from the priority buffer to the wireless terminal(s) 5.

The buffer control may include accumulating received packets in a buffer and transmitting the packets in the ascending order of the SNs of the received packets accumulated in the buffer.

While it is desirable that the packet transmission and reception unit 131 of the radio base station 3 include a DPI function for reading IP headers, the present invention is also applicable to other cases. For example, if the packet transmission apparatus 1 arranged in a core network uses a packet in GTP-U or a lower layer illustrated in FIG. 3 to notify the radio base station 3 of the packet type, the radio base station 3 can process the packet in this layer. Thus, in such case, the packet transmission and reception unit 131 does not need to include a DPI function.

Figure 7:
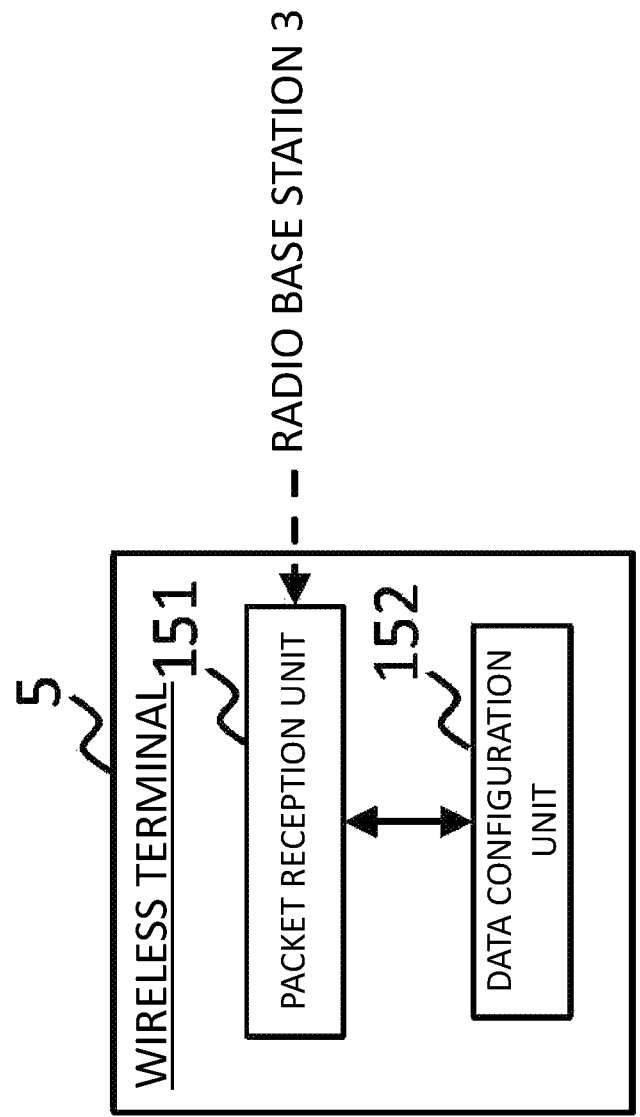
FIG. 7 illustrates a block diagram of a configuration example of a wireless terminal according to the first exemplary embodiment.

FIG. 7 illustrates a block diagram of a configuration example of a wireless terminal 5 according to the present exemplary embodiment. As described above, the wireless terminal 5 may be either the wireless terminal 5-1 or the wireless terminal 5-2 in (a) and (b) of FIG. 1.

In FIG. 7, the wireless terminal 5 includes a packet reception unit 151 as reception means and a data configuration unit 152 as data configuration means. Among the function blocks included in the wireless terminal 5, FIG. 7 illustrate only a few of the constituent elements according to the present exemplary embodiment. Namely, the wireless terminal 5 also includes a function block(s) (not illustrated) for causing the wireless terminal 5 to function as a wireless terminal. For example, the wireless terminal 5 includes a function of reporting CSI including, for example, a CQI indicating radio quality as described above in accordance with an instruction from the radio base station 3. For example, the wireless terminal 5 includes a function of communicating with the packet transmission apparatus 1 such as a content transmission apparatus or a different wireless terminal via the radio base station 3 or the network 2.

The packet reception unit 151 receives a packet transmitted from the radio base station 3 that performs transmission control to move forward the transmission order of a predetermined packet based on a packet type set in a packet by the packet transmission apparatus 1.

The data configuration unit 152 reconfigures the data transmitted from the packet transmission apparatus 1 by using the corresponding packet first. More specifically, the data configuration unit 152 reconfigures the data transmitted from the packet transmission apparatus 1 by using the packets in the order of the SNs of the TCP packets.

[Operation]

Figure 8:
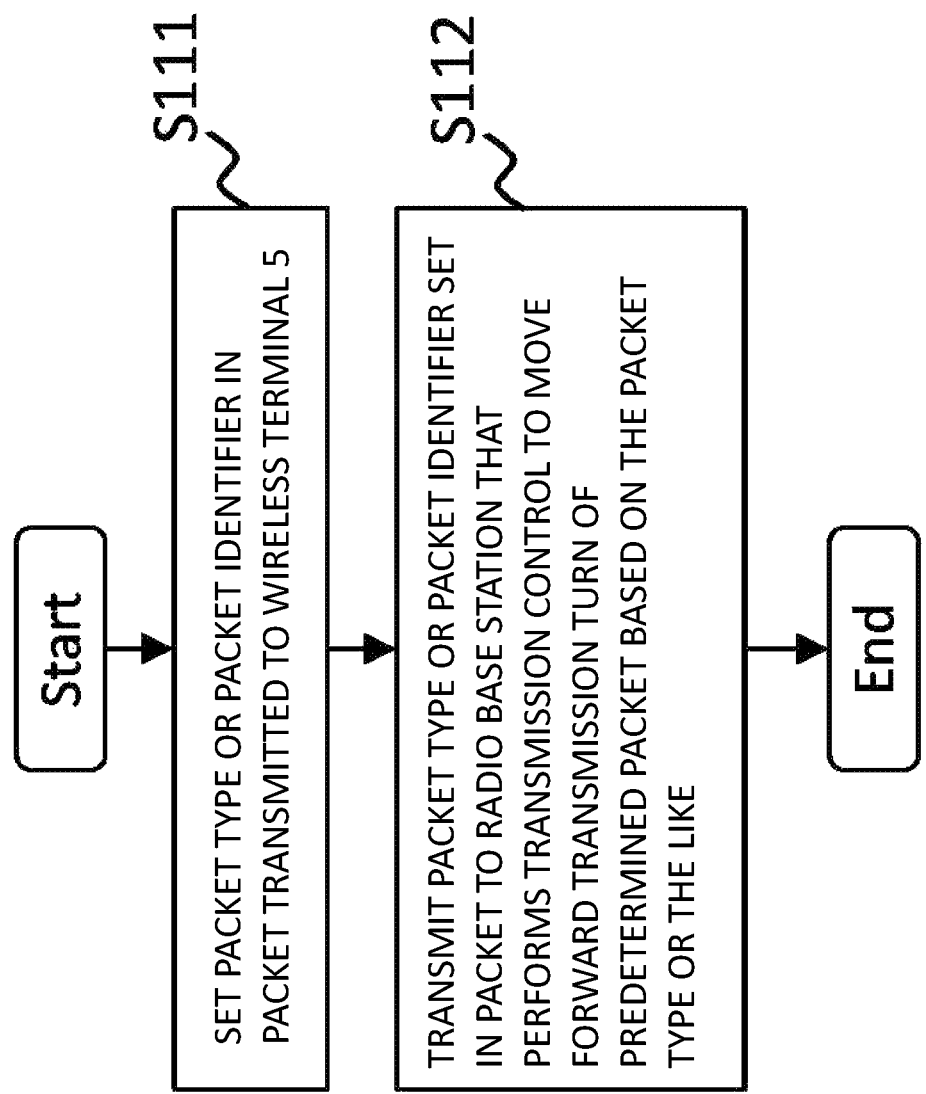
FIG. 8 illustrates a flowchart of an operation example of a packet transmission apparatus according to the first exemplary embodiment.

Next, an operation example of the packet transmission apparatus 1 according to the present exemplary embodiment will be described with reference to a flowchart in FIG. 8.

The packet transmission apparatus 1 sets a packet type in an individual packet transmitted to the wireless terminal(s) 5 (step S111). More specifically, when the packet transmission apparatus 1 is a source node such as a content transmission apparatus or a wireless terminal other than the wireless terminals 5, the packet transmission apparatus 1 allocates an SN to data addressed to the wireless terminal(s) 5, divides the data into TCP packets, and sets the packet type or the like of an individual TCP packet in an unused area of the IP header, for example. If the packet transmission apparatus 1 is a relay apparatus such as a P-GW arranged in a core network, the packet transmission apparatus 1 sets the packet type in the IP header of the corresponding packet received from an upper node than the packet transmission apparatus 1. In such case, the packet transmission apparatus 1 may determine whether the received packet is a retransmitted TCP packet, for example, from the TCP header information read by using a DPI function. For example, the packet transmission apparatus 1 may hold the TCP SN of a received packet. In such case, if the packet transmission apparatus 1 receives a packet having the same TCP SN, the packet transmission apparatus 1 may determine that this packet received again is a retransmitted TCP packet.

The packet transmission apparatus 1 transmits an individual packet in which the corresponding packet type is set to the radio base station 3 (step S112). As described above, various methods can be used to notify the radio base station 3 of the packet type.

Figure 9:
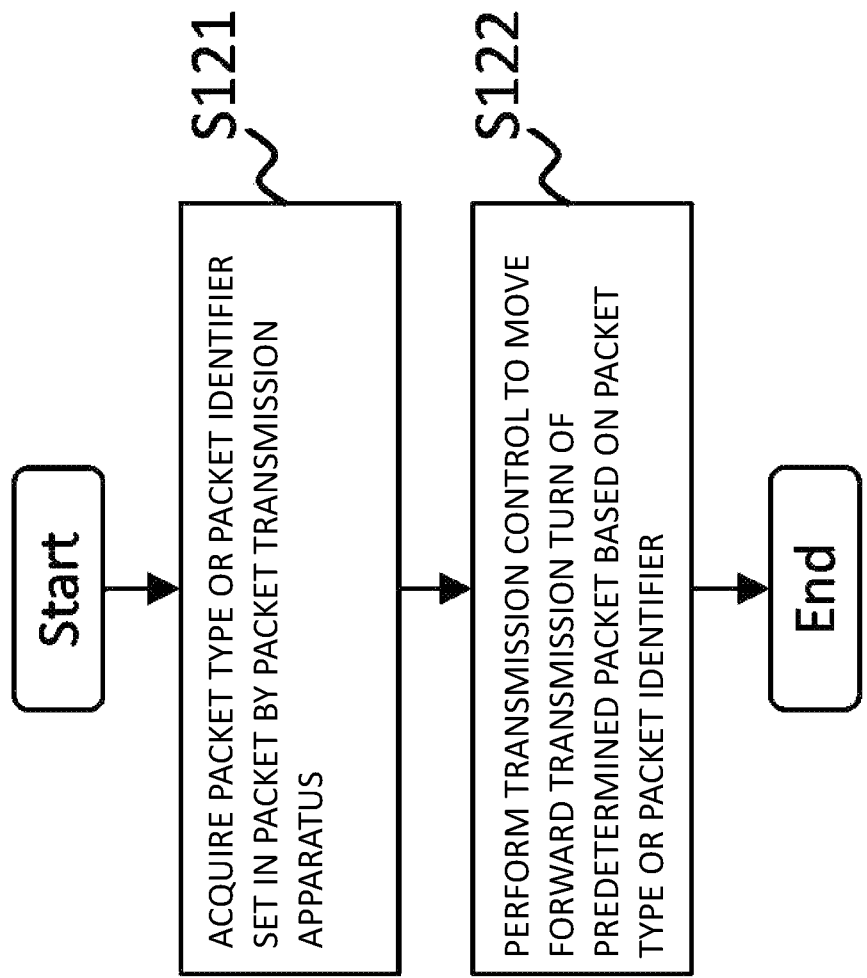
FIG. 9 illustrates a flowchart of an operation example of the radio base station according to the first exemplary embodiment.

Next, an operation example of the radio base station 3 according to the present exemplary embodiment will be described with reference to a flowchart in FIG. 9. This flowchart described as a suitable example is performed each time a TCP packet arrives at the radio base station 3 and is newly accumulated in a buffer. However, the present exemplary embodiment is not limited to this operation.

The radio base station 3 acquires the packet type set in a packet by the packet transmission apparatus 1 (step S121). More specifically, when the radio base station 3 receives a packet transmitted via the network 2, the packet transmission and reception unit 131 reads and acquires the packet type set, for example, in the header of the received packet. Next, the transmission control unit 132 encapsulates this packet, allocates an SN, and accumulates the packet in a buffer (not illustrated) in the radio base station 3. If this buffer is a PDCP buffer, this packet is encapsulated into a PDCP packet, and a PDCP SN is allocated to the PDCP packet. If the packet type is set in the IP header of the packet, the packet type of the packet is read as follows. Namely, by using a DPI function, the packet transmission and reception unit 131 reads the header of the IP packet including the corresponding TCP packet, namely, the 14th Bit of the IP header. If the read information indicating the packet type is 0, the packet transmission and reception unit 131 determines that the received packet is an initially transmitted TCP packet. If the read information indicating the packet type is 1, the packet transmission and reception unit 131 determines that the received packet is a retransmitted TCP packet. The packet transmission and reception unit 131 determines this retransmitted packet to be a priority packet. The packet transmission and reception unit 131 notifies the transmission control unit 132 of the determination result.

Next, based on the packet type, the radio base station 3 performs transmission control to move forward the transmission order of a predetermined packet (step S122). Hereinafter, buffer control, which is an example of the transmission control to move forward the transmission order of a predetermined packet, will be described. Based on the determination result given by the packet transmission and reception unit 131, the transmission control unit 132 performs buffer control to preferentially transmit a retransmitted TCP packet(s) to the wireless terminal(s). While various methods may be used for this buffer control, in the present exemplary embodiment, the accumulation order of the packets currently accumulated in the buffer is changed so that the retransmitted TCP packet(s) is transmitted more quickly (at an earlier order).

For example, if the buffer, which is the control target of the transmission control unit 132, is a PDCP buffer in the radio base station 3, the transmission control unit 132 allocates a PDCP SN and a PDCP header to the corresponding packet in the PDCP buffer. Necessary changes are made so that the PDCP SN of the PDCP packet in which the retransmitted TCP packet is encapsulated represents a smaller number than the SNs of the other PDCP packets. By performing this control, this retransmitted TCP packet can be transmitted from the buffer more quickly.

Next, a scheduler not illustrated determines allocation of radio resources for transmission to the wireless terminal(s) 5 in the accumulation order in which the packets are buffered in the buffer. Next, the radio base station 3 transmits the corresponding packet to the wireless terminal(s) 5.

Figure 10:
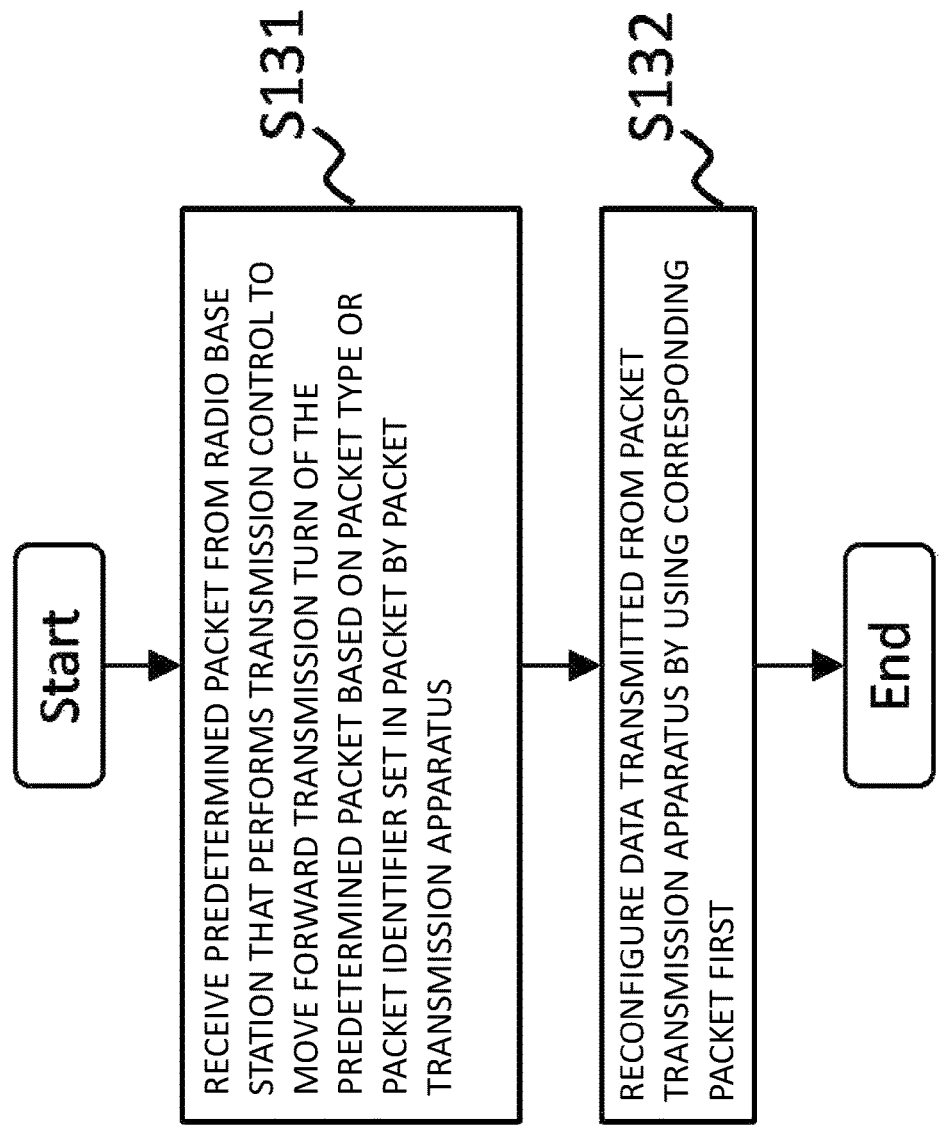
FIG. 10 illustrates a flowchart of an operation example of the wireless terminal according to the first exemplary embodiment.

Next, an operation example of a wireless terminal 5 according to the present exemplary embodiment will be described with reference to a flowchart in FIG. 10.

The wireless terminal 5 receives a packet transmitted from the radio base station 3 that performs transmission control to move forward the transmission order of a predetermined packet based on a packet type set in a packet by the packet transmission apparatus 1 (step S131).

Next, the wireless terminal 5 reconfigures the data transmitted from the packet transmission apparatus 1 by using the corresponding packet first (step S132). More specifically, the wireless terminal 5 reconfigures the data transmitted from the packet transmission apparatus 1 by using the packets in the order of the SNs of the TCP packets.

Since the radio base station 3 performs transmission control to move forward the transmission order of a predetermined packet based on a packet type set in a packet, the wireless terminal 5 can receive this predetermined packet (for example, a priority packet such as a retransmitted TCP packet) more quickly and reconfigure the data transmitted from the packet transmission apparatus 1 more quickly.

As described above, what type of packet needs to be accumulated in the PDCP buffer (which protocol of packet needs to be accumulated) and the order of the allocation of PDCP SNs and PDCP headers depend on the implementation. For example, packets of an upper layer than PDCP (for example, IP packets) may directly (as they are) be accumulated in the PDCP buffer. In such case, when these packets are transmitted from the PDCP buffer, these packets are given PDCP SNs and PDCP headers and are next transmitted to a different layer as PDCP packets.

Namely, the buffer control according to the present exemplary embodiment may be performed on packets (for example, IP packets) in an upper layer than PDCP that are accumulated in the PDCP buffer. In such case, when an upper layer packet is a retransmitted TCP packet, the buffer control may be performed in such a manner that the retransmitted TCP packet is moved to the first position in the PDCP buffer. In addition, a temporary SN may be allocated in the PDCP buffer, and this temporary SN may be used in the buffer control.

[Advantageous Effects]

According to the related technology, priority control cannot be performed at the packet level using a network protocol between a wireless terminal and a packet transmission apparatus. This is because a network protocol layer in which a radio base station performs processing is different from that in which the wireless terminal and the packet transmission apparatus perform processing. Namely, a radio base station cannot determine priority of an individual packet in the network protocol between the wireless terminal and the packet transmission apparatus. In the present exemplary embodiment, the packet transmission apparatus sets a packet type in a packet in the network protocol between the wireless terminal and the packet transmission apparatus, and the radio base station checks the packet type set in the packet. In this way, the radio base station can determine packets having high priority and perform transmission control on the determined packets. As a result, the communication delay of the packets having high priority can be reduced.

Second Exemplary Embodiment

[Configuration]

In a second exemplary embodiment, a specific example of the radio base station, the packet transmission apparatus, and the wireless terminals according to the first exemplary embodiment will be described. In the present exemplary embodiment, as a suitable example, an example in which the packet transmission apparatus is a content transmission apparatus will be described. In addition, in the present exemplary embodiment, between a packet type or a packet identifier, the packet type is used.

Figure 11:
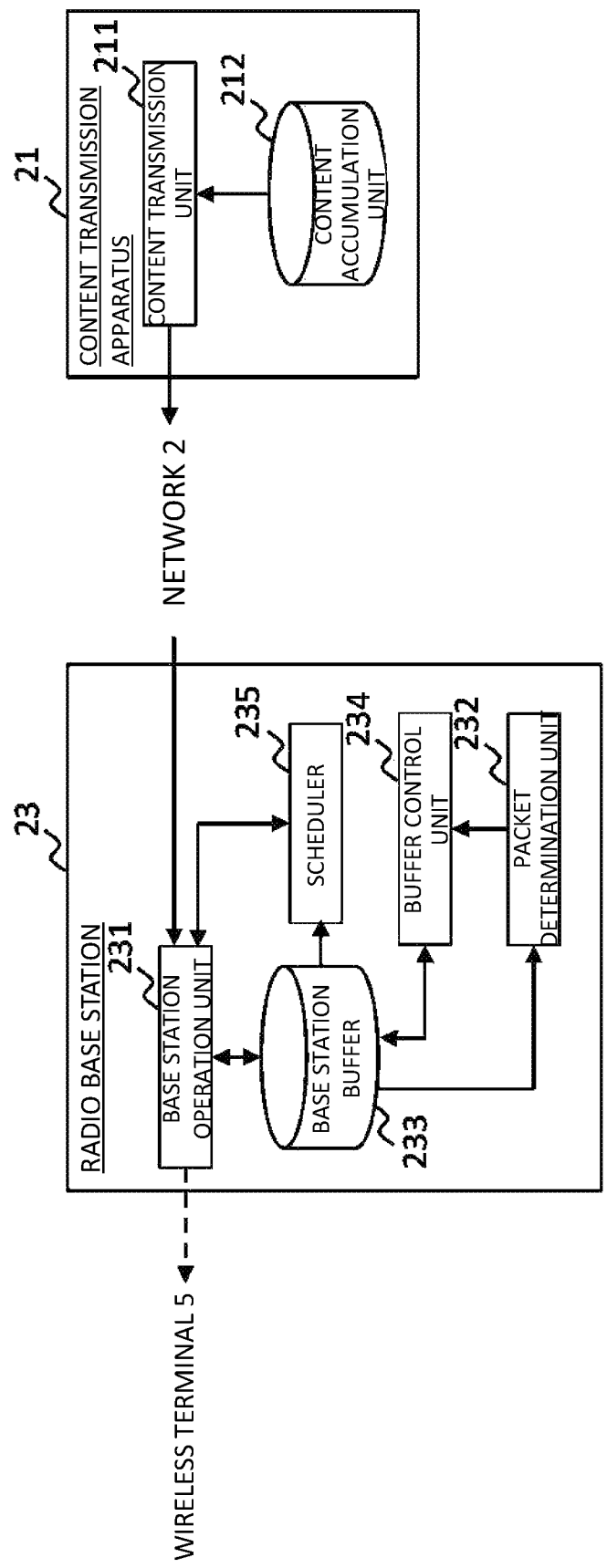
FIG. 11 illustrates block diagrams of configuration examples of a packet transmission apparatus and a radio base station according to a second exemplary embodiment.

FIG. 11 illustrates block diagrams of configuration examples of a content transmission apparatus 21 and a radio base station 23. The content transmission apparatus 21 includes a content accumulation unit 212 and a content transmission unit 211. The packet transmission unit 111 and the packet type setting unit 110 of the packet transmission apparatus 1 according to the first exemplary embodiment correspond to the content transmission unit 211 of the content transmission apparatus according to the second exemplary embodiment. The packet transmission and reception unit 131 of the radio base station 3 according to the first exemplary embodiment corresponds to a base station operation unit 231 and a packet determination unit 232 according to the second exemplary embodiment. The transmission control unit 132 according to the first exemplary embodiment corresponds to a buffer control unit 234 according to the second exemplary embodiment. In addition, since wireless terminals 5 according to the present exemplary embodiment are configured in the same way as those according to the first exemplary embodiment, description thereof will be omitted.

The content accumulation unit 212 previously holds content data used by the wireless terminals 5.

For example, if the content data is video or voice data, the content accumulation unit 212 holds the content data as data encoded in a plurality of different bit rates.

The content transmission unit 211 divides the content data accumulated in the content accumulation unit 212 into packets, allocates SNs, sets a packet type to an individual packet, and transmits these packets to the wireless terminal(s) 5. In the present exemplary embodiment, the content transmission unit 211 divides the content data into TCP packets. In the present exemplary embodiment, as in the first exemplary embodiment, a packet type indicates whether the corresponding packet is an initially transmitted TCP packet or a retransmitted TCP packet. By writing information indicating the packet type of a packet in an unused area (in Reserved Bits of the DS field, for example) of the IP header, the content transmission unit 211 notifies the radio base station 3 of the packet type. Since writing the packet type in the unused area of the IP header is performed in the same manner as in the first exemplary embodiment, description thereof will be omitted.

The radio base station 23 in FIG. 11 includes the base station operation unit 231, a base station buffer 233, the packet determination unit 232, the buffer control unit 234, and a scheduler 235.

The base station operation unit 231 receives a packet in which a packet type is set from the content transmission apparatus 21. More specifically, when the base station operation unit 231 receives a TCP packet addressed to the wireless terminal(s) 5 from the content transmission apparatus 21, the base station operation unit 231 encapsulates the TCP packet, allocates an SN, and accumulates the TCP packet in the base station buffer 233. If the base station buffer 233 is a PDCP buffer, this packet is encapsulated into a PDCP packet and is then given a PDCP SN. The base station operation unit 231 includes other functions, such as a function of receiving radio quality information such as a CQI from an individual wireless terminal 5 and a function of allocating radio resources and transmitting packets accumulated in the base station buffer 233 to an individual wireless terminal 5 in accordance with an instruction from the scheduler 235. However, these functions are equivalent to those of a radio base station commonly used in a wireless communication system, and the configurations and operations of these functions are known. Thus, description of these functions will be omitted.

The TCP packets addressed to the wireless terminal(s) 5 received from the content transmission apparatus 21 are encapsulated, given respective PDCP SNs, and accumulated in the base station buffer 233. The present exemplary embodiment assumes a PDCP buffer as a base station buffer, which is the buffer control target. However, alternatively, an RLC (Radio Link Control) buffer in which packets obtained by encapsulating PDCP packets are accumulated may be used as the buffer control target buffer.

The packet determination unit 232 reads the packet type of an individual TCP packet and determines priority of the individual TCP packet. The packet determination unit 232 according to the present exemplary embodiment uses a DPI function to read the 14th Bit in the IP header of a received packet. If the 14th Bit represents 0, the packet determination unit 232 determines the received packet is an initially transmitted TCP packet. If the 14th Bit represents 1, the packet determination unit 232 determines the received packet is a retransmitted TCP packet and determines this retransmitted packet to be a priority packet. The packet type may be read before or after the corresponding packet is accumulated in the base station buffer 233 controlled by the buffer control unit 234.

By using the determination result obtained by the packet determination unit 232, the buffer control unit 234 performs buffer control on the corresponding PDCP packet accumulated in the base station buffer 233. In the present exemplary embodiment, the SN of the PDCP packet is changed.

In view of the CQI(s) supplied from the wireless terminal(s) 5, the scheduler 235 estimates the downlink data channel (SINR (Signal to Interference plus Noise Ratio) of the PDSCH (Physical Downlink Shared CHannel)) through which the PDCP packet is transmitted and determines radio resources allocated to the wireless terminal(s) 5. The radio resources indicate PRBs (Physical Resource Blocks), MCS (Modulation and Coding Schemes) Index, etc. More PRBs and a larger MCS Index achieve a larger transmission data size (TBS (Transport Block Size)). Based on an instruction from the scheduler 235, the base station operation unit 231 transmits the PDCP packets buffered in the base station buffer 233 in the ascending order of the SNs of the PDCP packets. If the TBS is small compared to the PDCP packet size, segmentation is performed and transmission to the wireless terminal(s) 5 is then performed. These are functions equivalent to those of a scheduler of a radio base station commonly used.

In the present exemplary embodiment, the functions of accumulating the receiving packets in a buffer and transmitting the packets accumulated in the buffer in the ascending order of the SNs have been described as functions of the base station operation unit 231. However, these functions may be included in the buffer control function of the buffer control unit 234.

[Operation]

Figure 12:
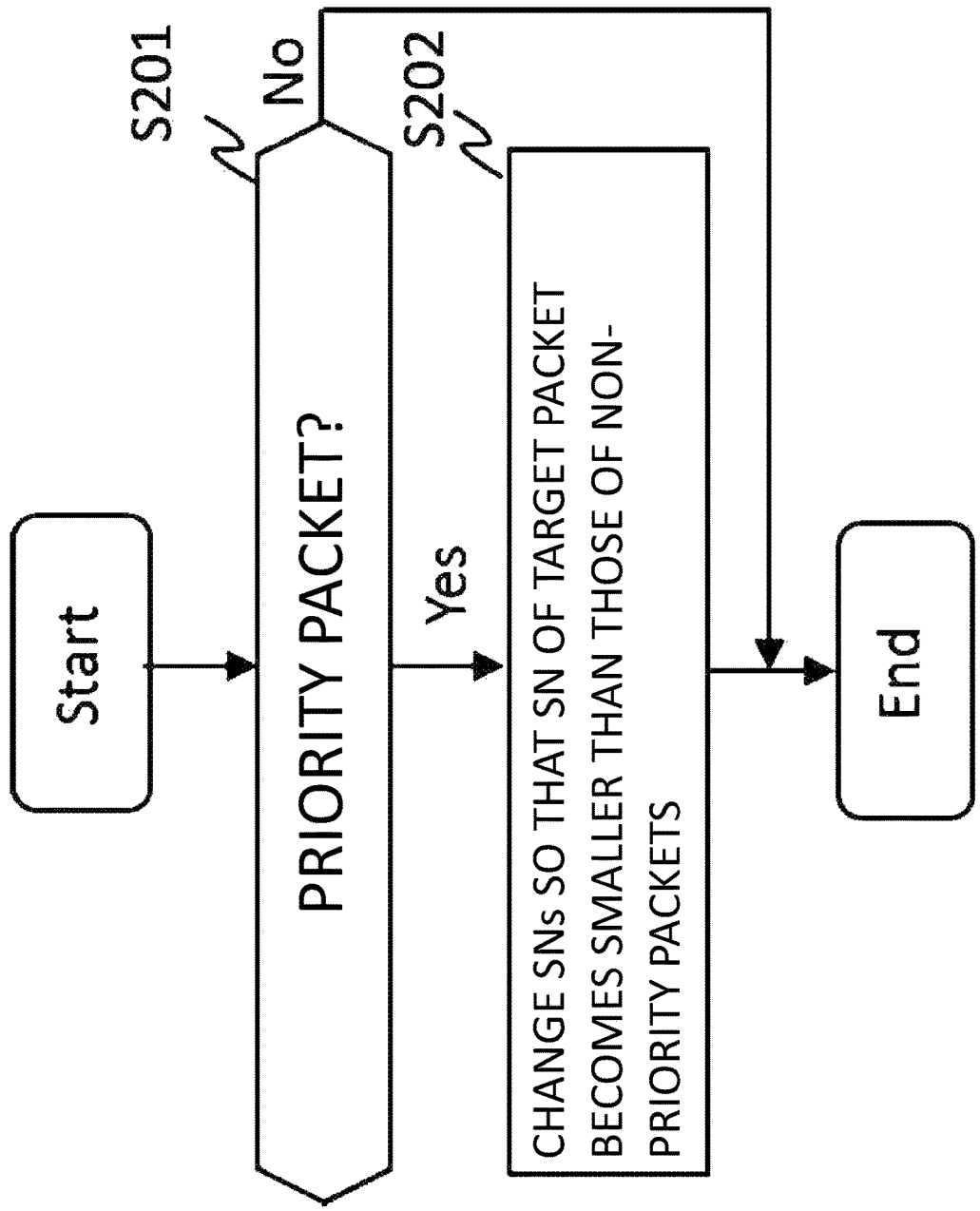
FIG. 12 illustrates a flowchart of buffer control according to the second exemplary embodiment.

Next, an operation according to the present exemplary embodiment will be described with reference to a flowchart in FIG. 12. FIG. 12 illustrates a specific example of buffer control performed by the radio base station 23 according to the present exemplary embodiment. Since other operations are the same as those in the flowchart (FIG. 9) according to the first exemplary embodiment, description thereof will be omitted. This flowchart is performed each time a TCP packet arrives at the radio base station 23 and is newly accumulated in the base station buffer 233.

First, in step S201, the packet determination unit 232 determines the packet type of a TCP packet that has arrived at the base station buffer 233 and determines priority of the TCP packet (whether or not the TCP packet is a priority packet). As described above, in the present exemplary embodiment, a retransmitted TCP packet is a priority packet. If the TCP packet is a priority packet (step S201, Yes), the processing proceeds to step S202, and the SNs of the PDCP packets in the base station buffer 203 are changed so that the PDCP SN of this target packet becomes smaller than the PDCP SNs of the non-priority packets. If the TCP packet is not a priority packet (step S201, No), the radio base station 23 ends the processing.

Figure 13:
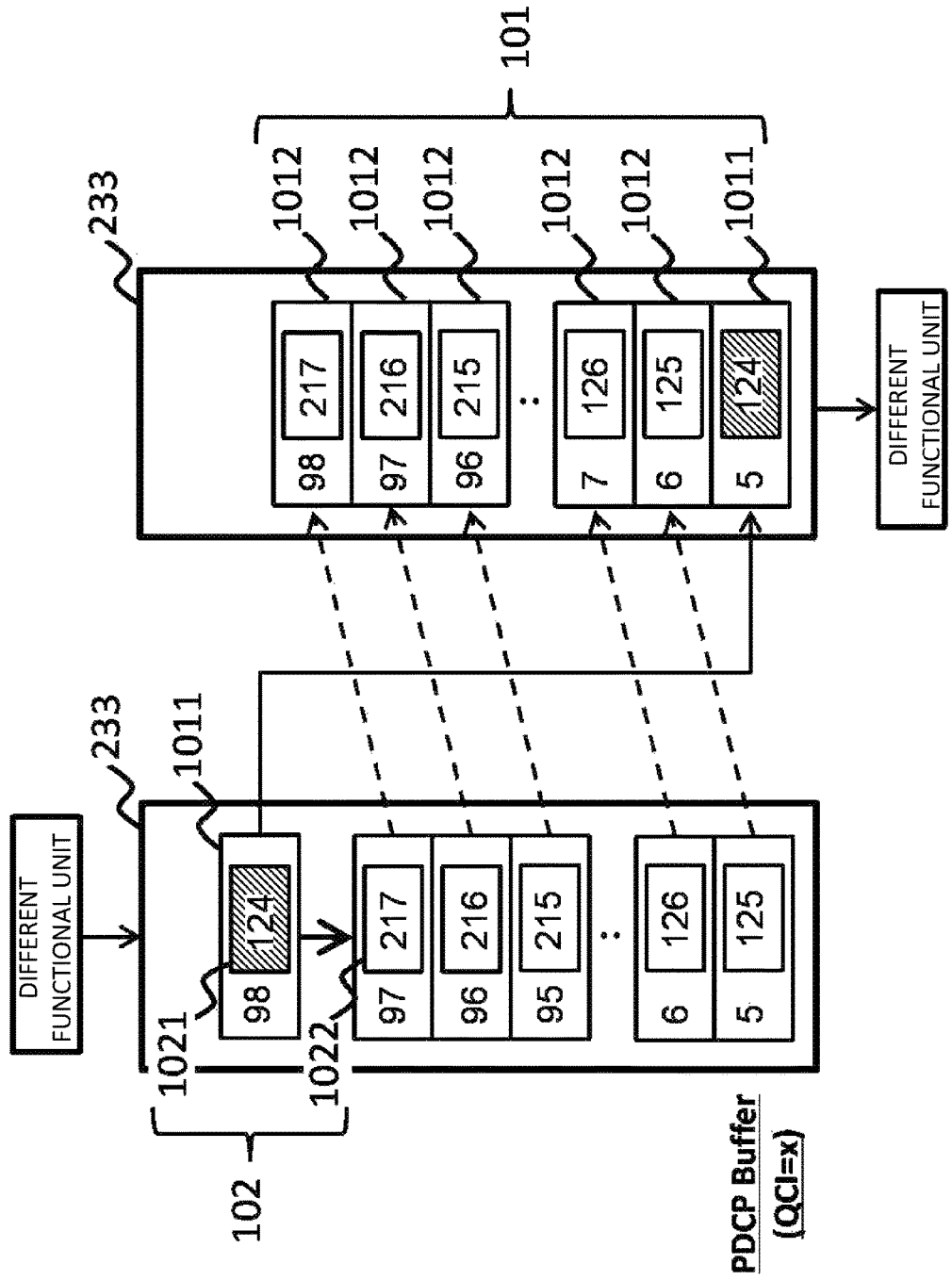
FIG. 13 illustrates state examples of a PDCP buffer according to the second exemplary embodiment.
Figure 28:
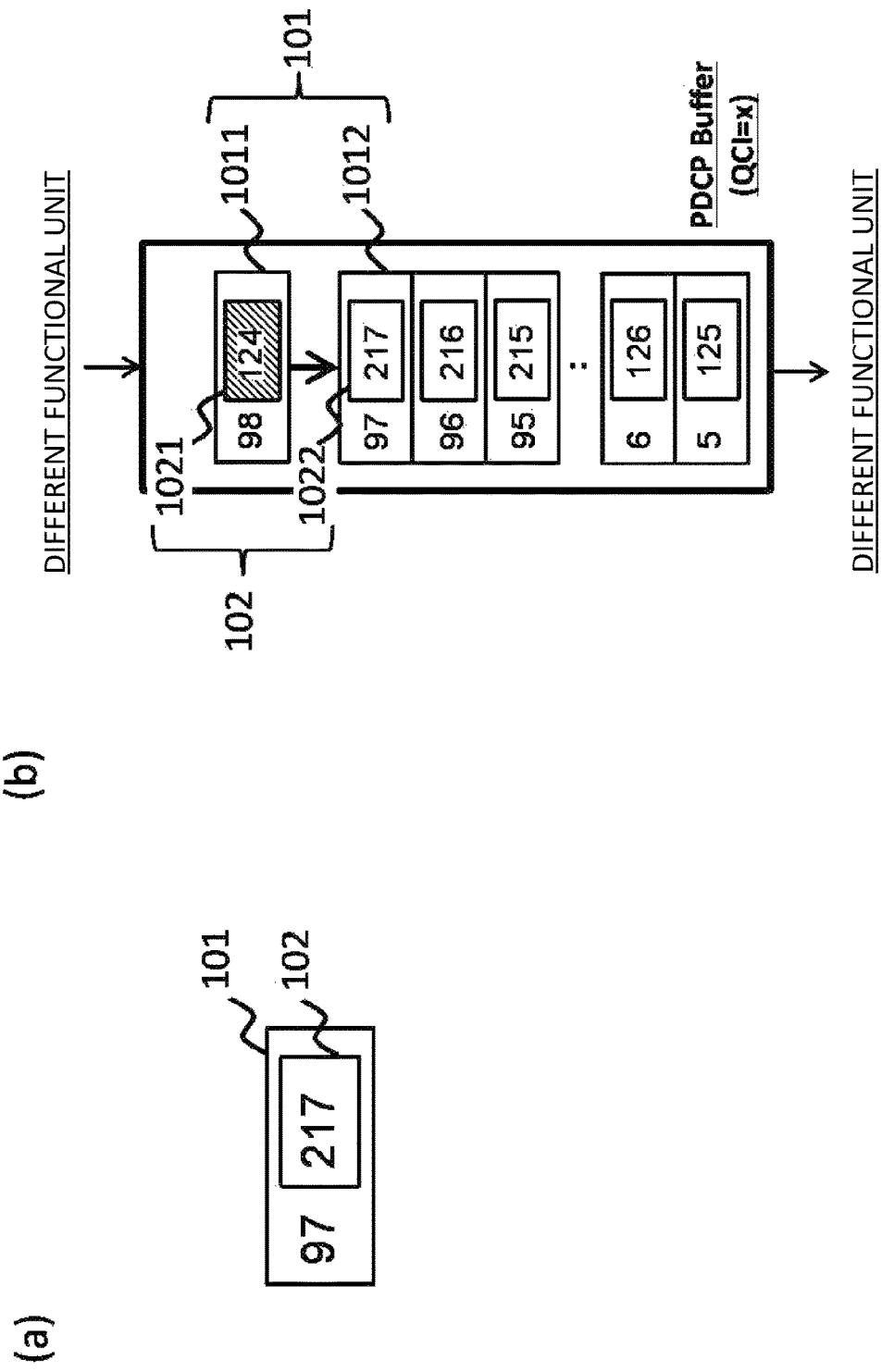
FIG. 28 illustrates a problem with related techniques about a buffer in a base station.

FIG. 13 illustrates state examples of the PDCP buffer before and after the present flowchart is performed. A specific example of the buffer control illustrated by the flowchart in FIG. 12 will be described with reference to FIG. 13. In FIG. 13, as in FIG. 28, 101 indicates PDCP packets, and 102 indicates a TCP packet. In addition, 1021 indicates a retransmitted TCP packet, and 1022 indicates initially transmitted TCP packets. In addition, 1011 indicates a PDCP packet in which the retransmitted TCP packet is encapsulated, and 1012 indicates PDCP packets in which the initially transmitted TCP packets 1012 are encapsulated, respectively. When the TCP packet 1021 arrives at the PDCP buffer as the base station buffer 233, the TCP packet 1021 is accumulated in the buffer as the PDCP packet 1011 whose PDCP SN is 98. The packet determination unit 232 determines the packet type of the PDCP packet 1011 accumulated in the PDCP buffer and determines priority of the TCP packet 1021 included in the PDCP packet 1011 (step S201). If the TCP packet 1021 is a priority packet (step S201, Yes), the buffer control unit 234 changes the SN of the PDCP packet 1011 in which the TCP packet 1021 is encapsulated from "98" to "5," which is the smallest number of all the SNs of the currently stored PDCP packets. In addition, the buffer control unit 234 increments each of the SNs of the PDCP packets 1012 by one (step S202). By performing the present flowchart in this way, the PDCP SNs are changed, and the TCP packet 1021 is accumulated at the first position in the buffer as the PDCP packet 1011 whose SN is 5. Next, since the scheduler 235 transmits the PDCP packets in the ascending order of the SNs, the retransmitted TCP packet is transmitted preferentially. Thus, interruption or stop of the corresponding application is reduced, and duration of the interruption or stop is also reduced.

The packet determination unit 232 may determine the packet type and priority before the corresponding packet is accumulated in the base station buffer 233 (PDCP buffer). For example, the determination of the packet type and priority may be performed in the GTP-U layer before the corresponding packet is accumulated in the PDCP buffer.

In addition, while, in the above example, the buffer control unit 234 changes the SN of the PDCP packet 1011 in which the TCP packet 1021 is encapsulated from "98" to "5," which is the smallest number in all the SNs of the currently stored PDCP packets, the present exemplary embodiment is not limited to such example. For example, if the packet having the smallest SN in all the SNs of the currently stored PDCP packets is a priority packet (a retransmitted TCP packet), the buffer control unit 234 may change the SN of the target packet to "6," which is the second smallest number in the SNs of all the currently stored PDCP packets.

In addition, it is desirable that the packets on which the present buffer control is performed be only the PDCP packets whose bit has not been transmitted at all to a lower layer, not all the packets accumulated in the PDCP buffer. However, the present exemplary embodiment is not limited to this mode. After confirming that non-target packets have been transmitted in a lower layer, these packets are removed from the PDCP buffer.

In addition, while, in the present exemplary embodiment, a packet type indicates whether the corresponding packet is an initially transmitted TCP packet or a retransmitted TCP packet, the present invention is not limited to such example. For example, information indicating whether or not the corresponding packet is prefetched data may be used.

In such case, if the corresponding packet is not prefetched data, the packet determination unit 232 determines that the corresponding packet is data immediately needed by an application and sets a higher priority in the corresponding packet. Prefetch is a function of reading data in a cache memory in advance. For example, in the case of viewing an Internet site using a browser, prefetch is a function of previously reading data in an area expected to be displayed in the future by scrolling in a memory while the data is not currently displayed on the screen.

In addition, two or more priority levels may be set by using a plurality of packet types. For example, the first priority level may be given to retransmitted and non-prefetched TCP packets, and the second priority level may be given to retransmitted and prefetched TCP packets. The third priority level may be given to initially transmitted and non-prefetched TCP packets, and the fourth priority level may be given to initially transmitted and prefetched TCP packets.

In addition, while the PDCP buffer is used as the buffer control buffer in the present exemplary embodiment, an RLC buffer may be used as the buffer control buffer.

As described above, what type of packet needs to be accumulated in the PDCP buffer (which protocol of packet needs to be accumulated) and the order of the allocation of PDCP SNs and PDCP headers depend on the implementation (the same holds true to the RLC). For example, packets of an upper layer than PDCP (for example, IP packets) may directly (as they are) be accumulated in the PDCP buffer. In such case, when these packets are transmitted from the PDCP buffer, these packets are given PDCP SNs and PDCP headers and are next transmitted to a different layer as PDCP packets.

Namely, as in the first exemplary embodiment, the buffer control according to the present exemplary embodiment may be performed on packets (for example, IP packets) in an upper layer than PDCP that are accumulated in the PDCP buffer. In such case, when an upper layer packet is a retransmitted TCP packet, the buffer control may be performed in such a manner that the retransmitted TCP packet is moved to the first position in the PDCP buffer. In addition, a temporary SN may be allocated in the PDCP buffer, and this temporary SN may be used in the buffer control.

[Advantageous Effects]

In the present exemplary embodiment, the content transmission apparatus notifies the radio base station of a packet type indicating whether the corresponding TCP packet transmitted to the wireless terminal(s) is a retransmitted packet, and the radio base station performs the buffer control based on the packet type. If the TCP packet is a retransmitted packet, the packet accumulation order in the PDCP buffer of the radio base station is changed so that this retransmitted TCP packet is transmitted preferentially. Thus, transmission delay of the retransmitted TCP packets can be reduced. As a result, deterioration of the QoE of the users of contents using TCP packets can be prevented.

Third Exemplary Embodiment

In a third exemplary embodiment, a second specific example of the radio base station, the packet transmission apparatus, and the wireless terminals according to the first exemplary embodiment will be described. In the present exemplary embodiment, as a suitable example, an example in which the packet transmission apparatus is a relay apparatus will be described. In addition, in the present exemplary embodiment, the relay apparatus is arranged in a core network. In addition, in the present exemplary embodiment, between a packet type or a packet identifier, the packet type is used.

Figure 14:
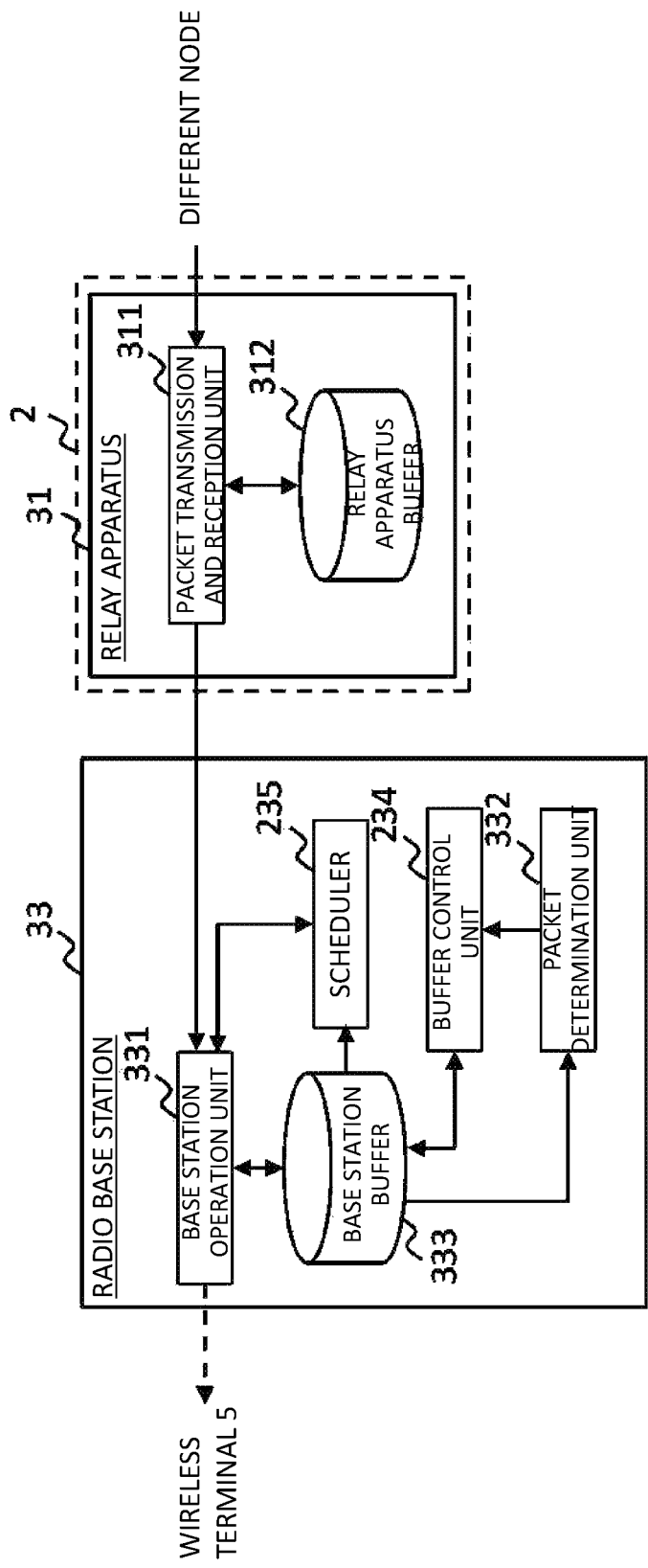
FIG. 14 illustrates block diagrams of configuration examples of a packet transmission apparatus and a radio base station according to a third exemplary embodiment.

FIG. 14 illustrates block diagrams of configuration examples of a relay apparatus 31 and a radio base station 33. The relay apparatus 31 is arranged in a network 2. In addition, the relay apparatus 31 includes a packet transmission and reception unit 311 and a relay apparatus buffer 312. The functions of the packet transmission unit 111 and the packet type setting unit 110 of the packet transmission apparatus 1 according to the first exemplary embodiment correspond to that of the packet transmission and reception unit 311 of the relay apparatus 31 according to the third exemplary embodiment. The packet transmission and reception unit 131 of the radio base station 3 according to the first exemplary embodiment corresponds to a base station operation unit 331 and a packet determination unit 332 according to the third exemplary embodiment. The transmission control unit 132 according to the first exemplary embodiment corresponds to a buffer control unit 234 according to the third exemplary embodiment. In addition, since wireless terminals according to the present exemplary embodiment are configured in the same way as the wireless terminals 5 according to the first exemplary embodiment, description thereof will be omitted.

When the packet transmission and reception unit 311 of the relay apparatus 31 receives a packet from a different node arranged in an upper layer, the packet transmission and reception unit 311 encapsulates the packet, allocates a predetermined SN, and accumulates the packet in the relay apparatus buffer 312. In addition, the packet transmission and reception unit 311 sets a packet type in the packet accumulated in the relay apparatus buffer 312. Next, the packet transmission and reception unit 311 transmits the packet in which the packet type is set to the radio base station 33 via the network 2. In the present exemplary embodiment, as in the first and second exemplary embodiments, the packet type indicates whether the corresponding packet is an initially transmitted TCP packet or a retransmitted TCP packet.

While it is desirable that the packet transmission and reception unit 311 include a DPI function of determining whether a TCP packet received from a different node is an initially transmitted TCP packet or a retransmitted TCP packet, the present invention is also applicable to other cases. Namely, as long as the packet transmission and reception unit 311 has a function of determining whether a TCP packet received from a different node is an initially transmitted TCP packet or a retransmitted TCP packet and setting a packet type in a packet, the packet transmission and reception unit 311 does not need to have a DPI function of acquiring information about an upper layer. The packet transmission and reception unit 311 according to the present exemplary embodiment uses a DPI function to read information about the TCP header of a received packet and determines whether or not this packet is a retransmitted TCP packet from the information about the TCP header. Next, the packet transmission and reception unit 311 notifies the radio base station 33 of the packet type (indicating whether the corresponding packet is a retransmitted TCP packet or not) by using a layer message that can be processed by the radio base station 33. The layer message that can be processed by the radio base station 33 is a GTP-U message, for example (FIG. 3). For example, if the packet transmission and reception unit 311 notifies the radio base station 33 of the packet type indicating whether the corresponding packet is a retransmitted TCP packet by using a GTP-U message, the packet type may be included in the header of a GTP-U packet in which the corresponding packet is encapsulated. Another layer message that can be processed by the radio base station 33 is a UDP (User Datagram Protocol)/IP message, for example.

Packets received from another upper node are encapsulated, given SNs, and stored in the relay apparatus buffer 312.

The radio base station 33 in FIG. 14 includes the base station operation unit 331, a base station buffer 333, the packet determination unit 332, the buffer control unit 234, and a scheduler 235.

The base station operation unit 331 receives a packet in which a packet type is set from the relay apparatus 31. When the base station operation unit 331 receives a TCP packet addressed to the wireless terminal(s) 5 from the relay apparatus 31, the base station operation unit 331 encapsulates the TCP packet, allocates an SN, and accumulates the packet in the base station buffer 333. More specifically, when the base station operation unit 331 receives a TCP packet addressed to the wireless terminal(s) 5 from the relay apparatus 31, the base station operation unit 331 performs processing in the UDP/IP layer, for example. Thereafter, the base station operation unit 331 relays the TCP packet and predetermined information from the GTP-U layer to the PDCP layer. Next, in the PDCP layer, the base station operation unit 331 allocates a PDCP SN to the TCP packet, allocates a PDCP header (encapsulation), and accumulates the TCP packet in the PDCP buffer. Examples of the predetermined information include a GTP-U SN and a packet type. The relaying of the packet and predetermined information between the GTP-U layer and the PDCP layer depends on the implementation. The relaying of the predetermined information may be performed by updating a database illustrated in FIG. 15, for example. For example, if the relay apparatus 31 has set a packet type in the header of a GTP-U packet, the packet determination unit 332 of the radio base station 33 determines, in the GTP-U layer, the packet type set in the header of the GTP-U packet including the TCP packet addressed to the wireless terminal(s) 5 and determines whether the TCP packet is a priority packet. Next, the packet determination unit 332 registers the GTP-U SN and the information indicating whether the corresponding packet is a priority packet in a database in association with each other, as illustrated in FIG. 15. The GTP-U SN can be taken over to the PDCP layer. Thus, the radio base station 33 allocates the PDCP SN that matches the GTP-U SN as illustrated in FIG. 15 to the TCP packet encapsulated into an IP packet. In addition, a PDCP header is allocated, and the TCP packet is accumulated in the PDCP buffer. In this way, the predetermined information may be relayed to the PDCP layer. In accordance with the above processing, priority of an individual PDCP packet accumulated in the PDCP buffer can be determined. Information indicating a packet type or a packet identifier may be registered in the database, in place of the information indicating whether the corresponding packet is a priority packet or not. The registration and updating on the database may be performed by a functional unit other than the packet determination unit 332. Since the packet determination unit 332 notifies the buffer control unit 234 of the priority of the corresponding TCP packet that corresponds to a PDCP SN registered in the database, the buffer control unit 234 can perform, for example, the same buffer control as that according to the second exemplary embodiment, based on the PDCP SN and the priority of the TCP packet.

As in the other exemplary embodiments, the base station operation unit 331 includes other functions, such as a function of receiving radio quality information such as a CQI from an individual wireless terminal 5 and a function of allocating radio resources and transmitting packets accumulated in the base station buffer 333 to an individual wireless terminal 5 in accordance with an instruction from the scheduler 235. However, these functions are equivalent to those of a radio base station commonly used in a wireless communication system, and the configurations and operations of these functions are known. Thus, description of these functions will be omitted.

The TCP packets addressed to the wireless terminal(s) 5 that have been received from the relay apparatus 31 are encapsulated, given predetermined SNs, and accumulated in the base station buffer 333. For example, if the base station buffer 333 is a PDCP buffer, a TCP packet is encapsulated into a PDCP packet, given a PDCP SN, and accumulated in the PDCP buffer. The present exemplary embodiment assumes a PDCP buffer as a base station buffer, which is the buffer control target. However, alternatively, an RLC (Radio Link Control) buffer in which packets obtained by encapsulating PDCP packets are accumulated may be used as the buffer control target buffer.

Based on the packet type included in the header of a layer message (for example, the header of a GTP-U packet) that has been transmitted from the relay apparatus 31 and that can be processed by the radio base station 33, the packet determination unit 332 determines whether this packet is a packet that needs to be preferentially transmitted to the wireless terminal(s) 5. In the present exemplary embodiment, the packet determination unit 332 can recognize that this packet type indicates a retransmitted TCP packet (a priority packet). The packet determination unit 332 may determine the packet type before or after the TCP packet is accumulated in the base station buffer 333.

Since the functions and operations of the buffer control unit 234 and the scheduler 235 are the same as those according to the second exemplary embodiment, description thereof will be omitted.

In the present exemplary embodiment, as in the second exemplary embodiment, the functions of accumulating the received packets in a buffer and transmitting the packets accumulated in the buffer in the ascending order of the SNs have been described as functions of the base station operation unit 331. However, these functions may be included in the buffer control function of the buffer control unit 234.

In addition, while a U-Plane packet is used as a layer packet that can be processed by the radio base station 33 in the present exemplary embodiment, the relay apparatus 31 may notify the radio base station 33 of the packet type by using a C-Plane (Control-Plane) message. For example, new control information may be defined on the C-Plane between a P-GW or an S-GW as a relay apparatus 1b and the radio base station 3. In this case, a packet type or a packet identifier may be included in the control information and supplied to the radio base station 33. When notified of the packet type or the packet identifier, the radio base station 33 can recognize that the packet indicated by the packet type included in the control information is a retransmitted TCP packet. The control information is, for example, a message processed in S1-AP (S1-Application Protocol) or a lower layer. If the relay apparatus notifies the radio base station 33 of a packet type or a packet identifier by using C-Plane control information, it is desirable that the radio base station 33 be notified of the C-Plane control information before the corresponding TCP packet arrives at the radio base station 33.

As described above, what type of packet needs to be accumulated in the PDCP buffer (which protocol of packet needs to be accumulated) and the order of the allocation of PDCP SNs and PDCP headers depend on the implementation (the same holds true to the RLC). For example, packets of an upper layer than PDCP (for example, IP packets) may directly be accumulated in the PDCP buffer. In such case, when these packets are transmitted from the PDCP buffer, these packets are given PDCP SNs and PDCP headers and are next transmitted to a different layer as PDCP packets.

Namely, as in the other exemplary embodiments, the buffer control according to the present exemplary embodiment may be performed on packets (for example, IP packets) in an upper layer than PDCP that are accumulated in the PDCP buffer. In such case, when an upper layer packet is a retransmitted TCP packet, the buffer control may be performed in such a manner that the retransmitted TCP packet is moved to the first position in the PDCP buffer. In addition, a temporary SN may be allocated in the PDCP buffer, and this temporary SN may be used in the buffer control.

[Advantageous Effects]

The present exemplary embodiment provides the following advantageous effect, in addition to those provided by the first and second exemplary embodiments. Namely, since the relay apparatus 31 according to the present exemplary embodiment notifies the radio base station 33 of a packet type in a layer in which the radio base station 33 can perform processing, the radio base station 33 does not need to include a DPI function.

Fourth Exemplary Embodiment

Next, a fourth exemplary embodiment of the present invention will be described. In the first to third exemplary embodiments, a packet type indicates whether the corresponding packet is an initially transmitted TCP packet or a retransmitted TCP packet. However, the present exemplary embodiment differs from the above exemplary embodiments in that the SN of a TCP packet is used as a packet identifier.

[Configuration]

Figure 16:
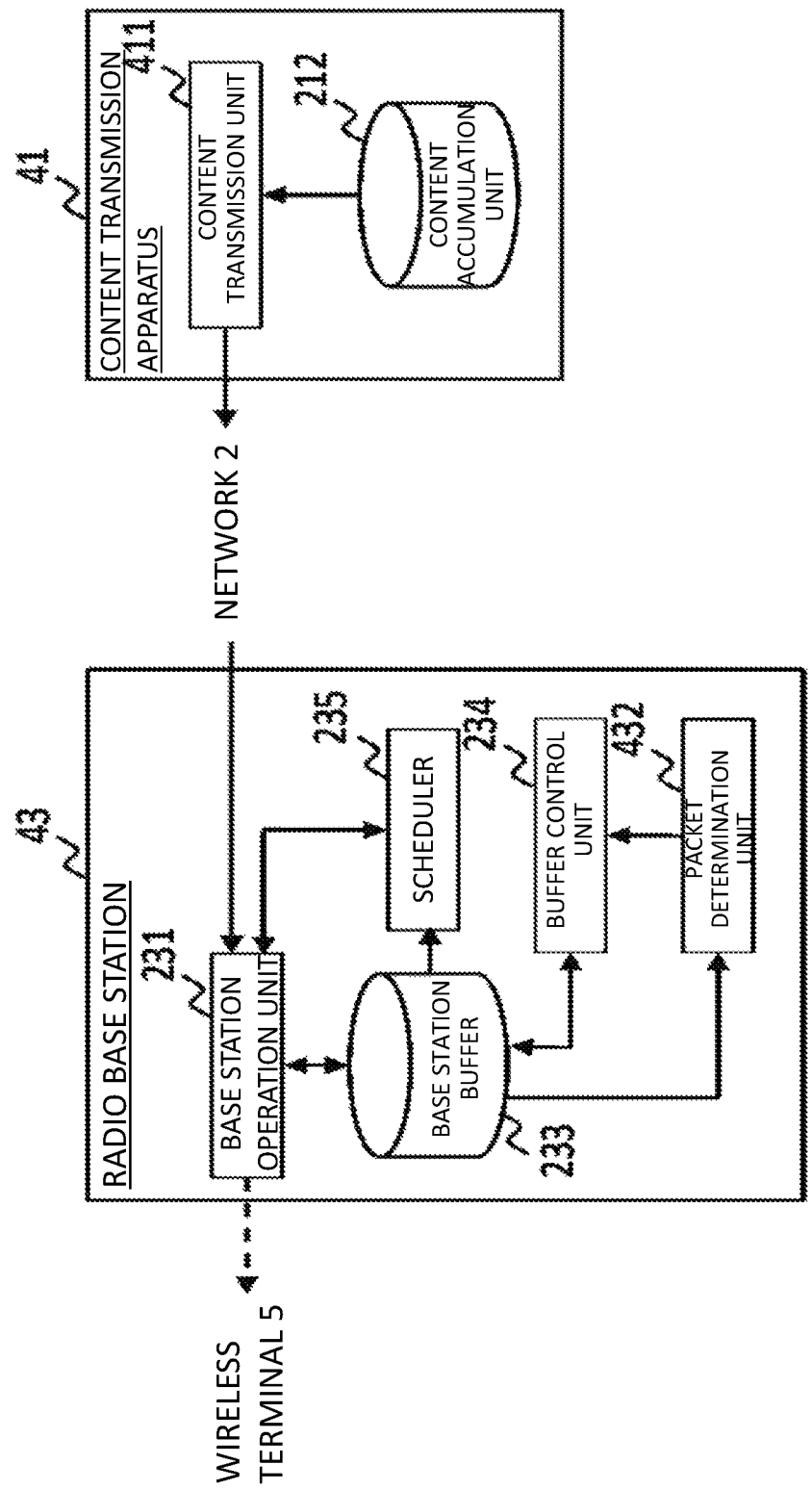
FIG. 16 illustrates block diagrams of configuration examples of a packet transmission apparatus and a radio base station according to a fourth exemplary embodiment.

FIG. 16 illustrates a block diagram of a configuration of a communication system according to a fourth exemplary embodiment of the present invention. The fourth exemplary embodiment differs from the second exemplary embodiment in that a content transmission unit 411 is added in place of the content transmission unit 211 of the content transmission apparatus 21 and in that a packet determination unit 432 is added in place of the packet determination unit 232 of the radio base station 23.

As in the second exemplary embodiment, the content transmission unit 411 divides content data addressed to a wireless terminal(s) 5 accumulated in a content accumulation unit 212 into packets and sets a packet identifier in an individual one of the packets. Next, the content transmission unit 411 transmits these packets to a radio base station 43. In the present exemplary embodiment, a TCP SN is used as the packet identifier. Thus, the same value as the SN written in the TCP header of the corresponding packet is also written in the Options field of the corresponding IP header.

As in the second exemplary embodiment, the packet determination unit 432 reads the packet identifier of an individual TCP packet and determines priority of the individual TCP packet. In the present exemplary embodiment, the packet determination unit 432 reads the Options field of the IP header. If the packet determination unit 432 reads a smaller TCP SN, the packet determination unit 432 determines that the packet has higher priority.

[Operation]

Figure 17:
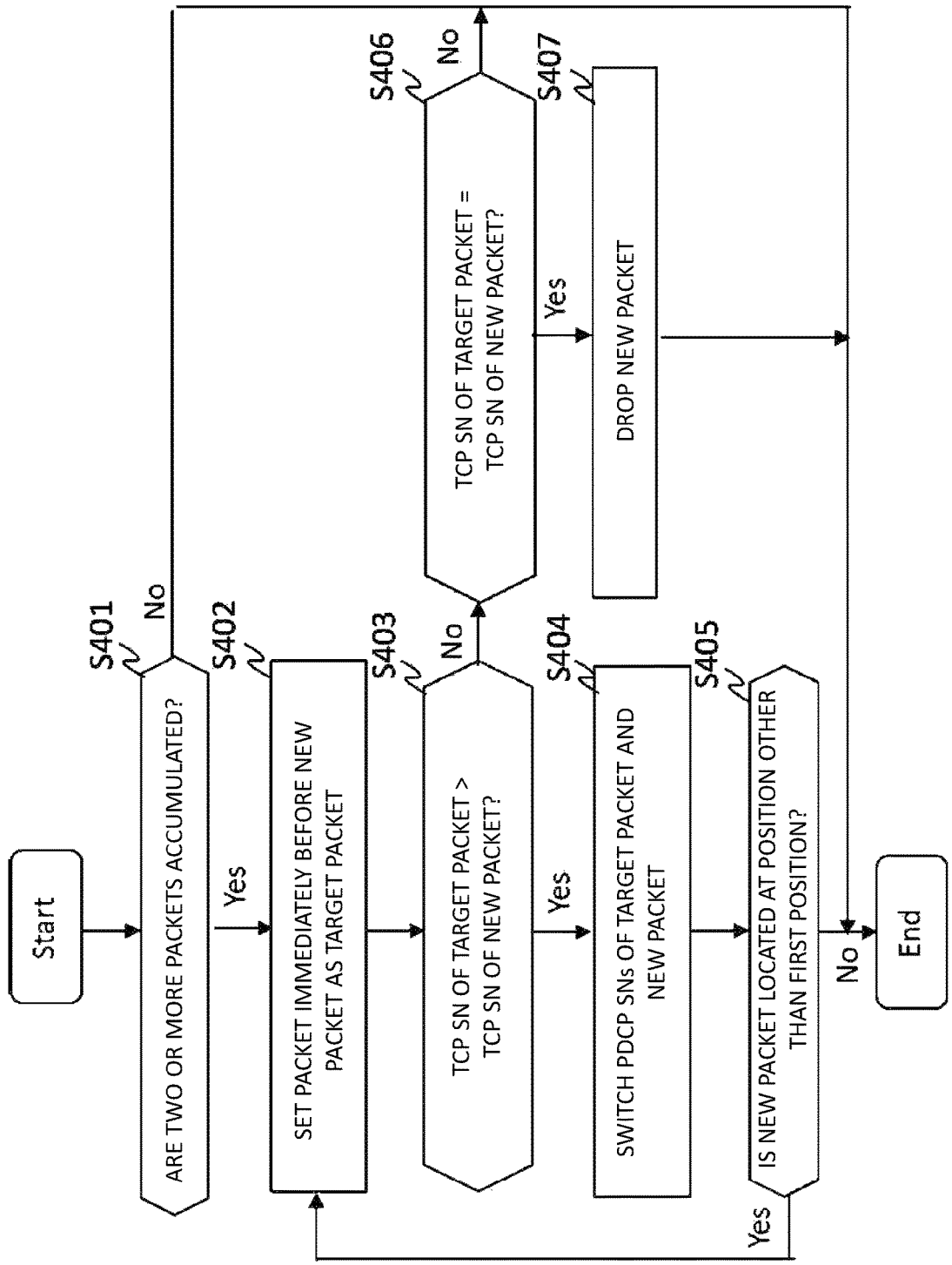
FIG. 17 illustrates a flowchart of buffer control according to the fourth exemplary embodiment.

Next, an operation according to the present exemplary embodiment will be described with reference to a flowchart in FIG. 17. In particular, buffer control performed by the radio base station 43 according to the present exemplary embodiment will be described with reference to FIG. 17. Since other operations are the same as those in the flowchart (FIG. 9) according to the first exemplary embodiment, description thereof will be omitted. As in the second exemplary embodiment, this flowchart is performed each time a TCP packet arrives at the radio base station 43 and is newly accumulated in a base station buffer 233.

First, in step S401, a buffer control unit 234 determines whether the number of PDCP packets accumulated in the base station buffer 233 is 2 or more. If two or more PDCP packets are accumulated (step S401, Yes), the processing proceeds to step S402. If only one PDCP packet is accumulated (step S401, No), there is no need to change the SN of the PDCP packet. Thus, the radio base station 43 ends the processing.

Next, in step S402, the buffer control unit 234 determines a PDCP packet located immediately before the newly encapsulated PDCP packet to be the PDCP packet whose SN is to be changed.

Next, in step S403, the TCP SN of the newly encapsulated PDCP packet is compared with that of the target PDCP packet. If the TCP SN of the newly encapsulated PDCP packet is smaller (step S403, Yes), the processing proceeds to step S404, and the PDCP SNs of the target PDCP packet and the newly encapsulated PDCP packet are exchanged each other. Next, in step S405, it is determined whether the newly encapsulated PDCP packet is located at a position other than the first position in the base station buffer 233. If the newly encapsulated PDCP packet is located at a position other than the first position (step S405, Yes), the processing returns to step S402. If the newly encapsulated PDCP packet is located at the first position (step S405, No), since the SN of the PDCP packet cannot be changed (or re-ordered) further, the radio base station 43 ends the processing.

Next, if No is determined in step S403, the processing proceeds to step S406, and the radio base station 43 determines whether the TCP SN of the newly encapsulated PDCP packet is the same as that of the target PDCP packet. If the same TCP SN is determined (step S406, Yes), the processing proceeds to step S407. To avoid redundantly accumulating the same TCP packets in the base station buffer 233, the radio base station 43 drops (discards) the newly encapsulated PDCP packet and ends the processing. If the TCP SN of the newly encapsulated PDCP packet is different from that of the target PDCP packet, the radio base station 43 ends the processing.

This operation of dropping the same TCP packets in steps S406 and S407 is also applicable in the other exemplary embodiments such as the first exemplary embodiment. State-examples of the PDCP buffer before and after the present flowchart is performed are the same as those according to second exemplary embodiment illustrated in FIG. 13.

As described above, what type of packet needs to be accumulated in the PDCP buffer (which protocol of packet needs to be accumulated) and the order of the allocation of PDCP SNs and PDCP headers depend on the implementation (the same holds true to the RLC). For example, packets of an upper layer than PDCP (for example, IP packets) may directly be accumulated in the PDCP buffer. In such case, when these packets are transmitted from the PDCP buffer, these packets are given PDCP SNs and PDCP headers and are next transmitted to a different layer as PDCP packets.

Namely, as in the first exemplary embodiment, the buffer control according to the present exemplary embodiment may be performed on packets (for example, IP packets) in an upper layer than PDCP that are accumulated in the PDCP buffer. In such case, when an upper layer packet is a retransmitted TCP packet, the buffer control may be performed in such a manner that the retransmitted TCP packet is moved to the first position in the PDCP buffer. In addition, a temporary SN may be allocated in the PDCP buffer, and this temporary SN may be used in the buffer control.

[Advantageous Effects]

In the present exemplary embodiment, the content transmission apparatus notifies the radio base station of a packet type indicating the SN of the corresponding TCP packet transmitted to the wireless terminal(s), and the radio base station performs the buffer control based on the packet type. By using the SN of the TCP packet, the radio base station can recognize whether or not the TCP packet is a retransmitted packet. If the TCP packet is a retransmitted packet, the radio base station changes the packet accumulation order in the PDCP buffer in the radio base station so that this retransmitted TCP packet is transmitted preferentially. Thus, transmission delay of the retransmitted TCP packets can be reduced. As a result, deterioration of the QoE of the users of contents using TCP packets can be prevented.

Fifth Exemplary Embodiment

Next, a fifth exemplary embodiment of the present invention will be described. The fifth exemplary embodiment differs from the other exemplary embodiments in that a plurality of buffers, each of which corresponds to a different priority, are arranged in a radio base station and in that packets are accumulated in different buffers based on their packet types. While the present exemplary embodiment will be described based on an example in which a packet type is used, a packet identifier may be used in place of the packet type as in the fourth exemplary embodiment.

[Configuration]

Figure 18:
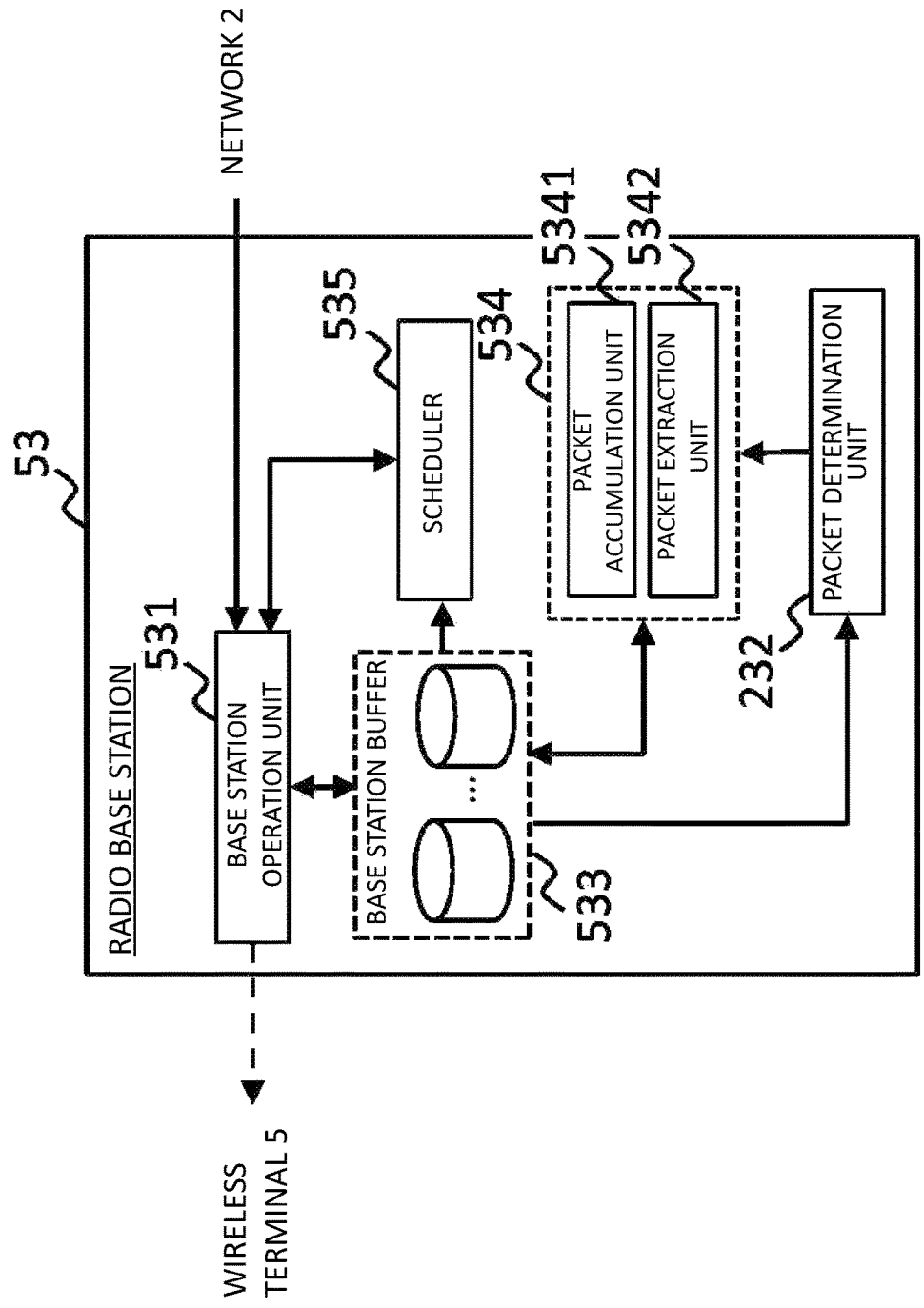
FIG. 18 illustrates a block diagram of a configuration example of a radio base station according to a fifth exemplary embodiment.

FIG. 18 illustrates a block diagram of a configuration of a radio base station according to the fifth exemplary embodiment of the present invention. The fifth exemplary embodiment differs from the second exemplary embodiment in that a base station operation unit 531, a base station buffer 533, a buffer control unit 534 (including a packet accumulation unit 5341 and a packet extraction unit 5342), and a scheduler 535 are included in place of the base station operation unit 231, the base station buffer 233, the buffer control unit 234, and the scheduler 235 of the radio base station 23.

When the base station operation unit 531 receives a TCP packet addressed to the wireless terminal(s) 5 from a packet transmission apparatus 1 (for example, a content transmission apparatus 21) not illustrated in FIG. 18 via a network 2, the base station operation unit 531 encapsulates the TCP packet and allocates an SN thereto. In addition, the base station operation unit 531 accumulates this TCP packet in the base station buffer 533.

The base station buffer 533 in FIG. 18 includes a plurality of buffers. The plurality of buffers are arranged in a single protocol layer. For example, a plurality of PDCP buffers are arranged in a PDCP layer. TCP packets are encapsulated, given SNs, and accumulated in the base station buffer 533. These SNs in the present exemplary embodiment may be given as serial numbers in the plurality of buffers or per buffer. While the base station buffer 533 includes PDCP buffers in the present exemplary embodiment, the present exemplary embodiment is not limited to such example. For example, the base station buffer 533 may alternatively include RLC buffers in which packets obtained by encapsulating PDCP packets are accumulated.

It is desirable that an individual one of the plurality of buffers has a different priority about packet transmission to a wireless terminal(s) 5. Namely, those packets accumulated in a buffer (a priority buffer) having a high transmission priority are transmitted to the wireless terminal(s) 5 more quickly than those accumulated in a buffer (a non-priority buffer) having a low priority.

For example, in the present exemplary embodiment, the plurality of buffers include a normal buffer (a PDCP buffer for QCI=x) in which packets whose QCI is x are accumulated and a priority buffer (a PDCP buffer for QCI=x). However, the present exemplary embodiment is not limited to such example. The base station buffer 533 may include two priority buffers. Namely, the base station buffer 533 may include a total of three buffers.

The buffer control unit 534 according to the present exemplary embodiment include the packet accumulation unit 5341 that accumulates packets in a predetermined buffer and the packet extraction unit 5342 that transmits the packets accumulated in the predetermined buffer in the ascending order of the SNs. In addition, the buffer control unit 534 (the packet accumulation unit 5341 and the packet extraction unit 5342) controls at least two buffers. More specifically, a packet determination unit 232 reads the packet type of a TCP packet (for example, whether the TCP packet is an initially transmitted TCP packet or a retransmitted TCP packet) and determines whether the TCP packet is a priority packet (a retransmitted TCP packet). If the packet determination unit 232 determines that the TCP packet is a priority packet, the packet accumulation unit 5341 accumulates the retransmitted TCP packet in a priority buffer of the plurality of buffers. The packet accumulation unit 5341 performs buffering (accumulates packets in the buffers) in at least two ways. In the first way, a corresponding packet accumulated in a buffer in a first layer is accumulated in another priority buffer in the first layer, depending on the priority based on the packet type or the like. In the second way, when a corresponding packet accumulated in a buffer in the first layer is passed over to a second layer different from the first layer, depending on the priority based on the packet type or the like, the corresponding packet is accumulated in a priority buffer of the plurality of buffers in the second layer.

Depending on the priority based on the packet type or the like, the packet extraction unit 5342 extracts packets accumulated in a predetermined buffer of the plurality of buffers (the base station buffer 533) in the ascending order of the SNs and passes the packets over to a lower layer.

To preferentially transmit the priority packets (for example, retransmitted TCP packets) accumulated in a PDCP buffer to the wireless terminal 5, the scheduler 535 allocates radio resources.

The base station operation unit 531 transmits the packets accumulated in the base station buffer 533 to the wireless terminal(s) 5, in accordance with an instruction from the scheduler 535.

Since the functions and operations of the packet determination unit 232 are the same as those according to the second exemplary embodiment, description thereof will be omitted.

[Operation]

Figure 19:
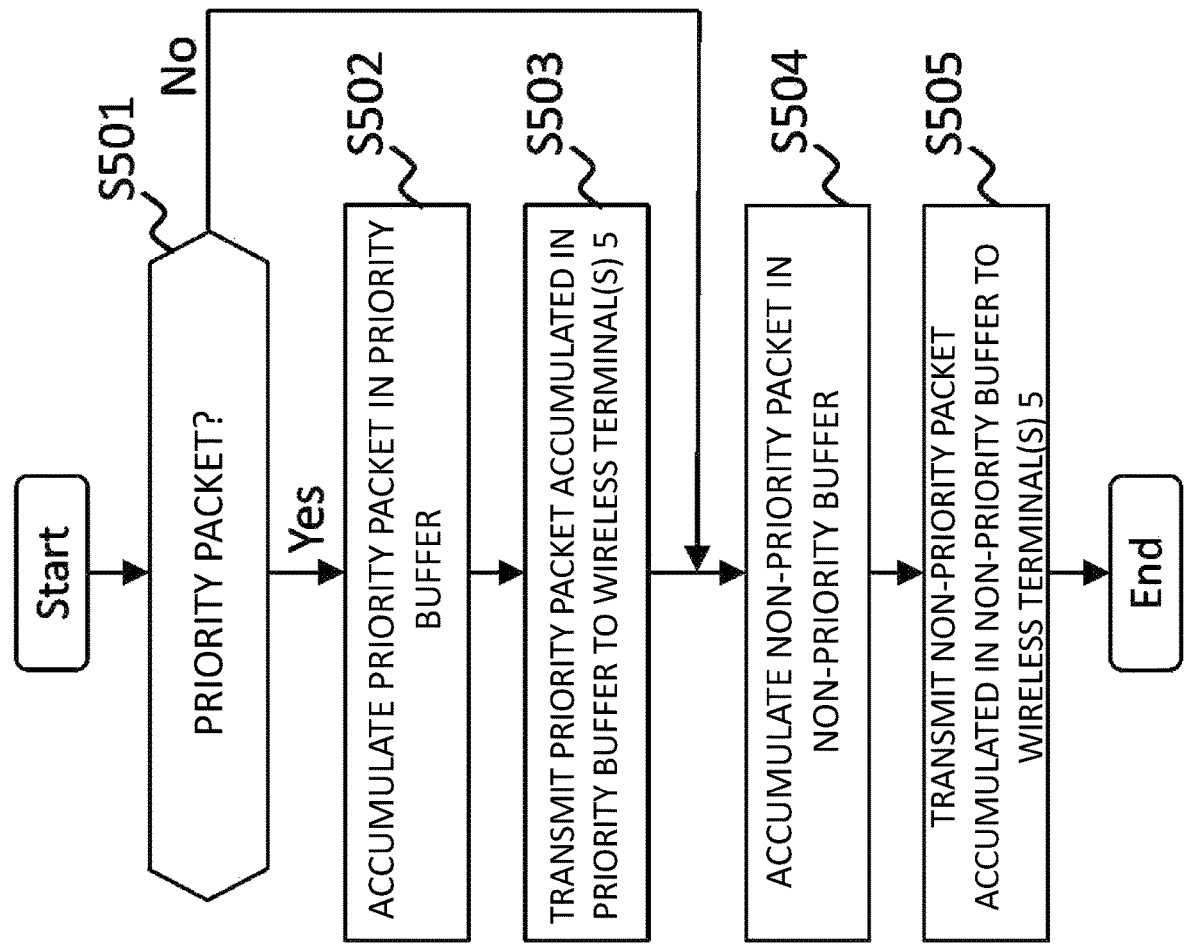
FIG. 19 illustrates a flowchart of buffer control according to the fifth exemplary embodiment.

Next, an operation according to the present exemplary embodiment will be described with reference to a flowchart in FIG. 19. FIG. 19 illustrates a specific operation example of the buffer control and the scheduler in the radio base station 3 according to the present exemplary embodiment. Since other operations are the same as those in the flowchart (FIG. 9) according to the first exemplary embodiment, description thereof will be omitted. This flowchart is performed each time a TCP packet arrives at the radio base station 3 and is newly accumulated in the base station buffer 533.

First, in step S501, the packet determination unit 232 determines the packet type of a TCP packet that has arrived at the radio base station 53 and determines priority of the TCP packet (whether the TCP packet is a priority packet). If the TCP packet is a priority packet (for example, a retransmitted TCP packet) (step S501, Yes), the processing proceeds to step S502, and the packet accumulation unit 5341 in the buffer control unit 534 accumulates this priority packet in a predetermined buffer (a priority buffer). Next, in step S503, the priority packet is preferentially transmitted from the PDCP buffer (the priority buffer) to the wireless terminal(s) 5. More specifically, the packet extraction unit 5342 preferentially extracts the priority packets accumulated in the priority buffer in the ascending order of the SNs of the priority packets and passes the packets over to a lower layer. Next, after the scheduler 535 performs allocation of the radio resources, etc., the priority packet is transmitted to the wireless terminal(s) 5.

In step S501, if the TCP packet is determined to be a non-priority packet (step S501, No), the processing proceeds to step S504. In step S504, the packet accumulation unit 5341 accumulates the non-priority packet (for example, an initially transmitted TCP packet) in another buffer (a non-priority buffer) in which no priority packet is accumulated. Next, in step S505, transmission is also performed from the non-priority buffer to the wireless terminal(s) 5. More specifically, the packet extraction unit 5342 also extracts the packets accumulated in the non-priority buffer in the ascending order of the SNs of the packets and passes the packets over to a lower layer. Next, after the scheduler 535 performs allocation of the radio resources, etc., the non-priority packet is also transmitted to the wireless terminal(s) 5. The operation in step S504 may be started after or during the operation in step S503. Namely, the priority packets and the non-priority packets may be transmitted temporally simultaneously.

Specific Example 1 According to Fifth Exemplary Embodiment

Figure 20:
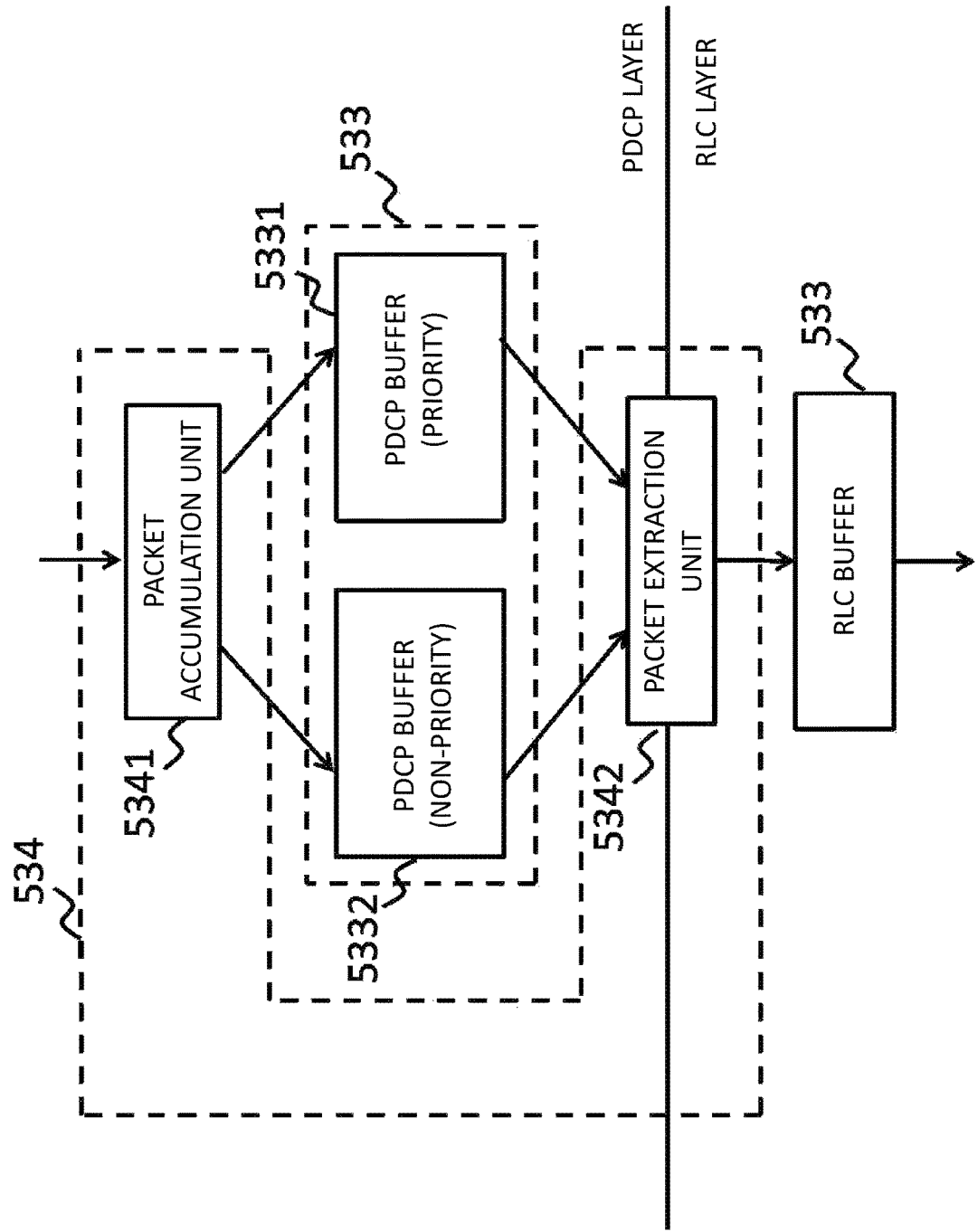
FIG. 20 illustrates specific example 1 of buffer control according to the fifth exemplary embodiment.

FIG. 20 illustrates specific example 1 of the buffer control performed by the buffer control unit 534 according to the present exemplary embodiment. In FIG. 20, the base station buffer 533 includes PDCP buffers and an RLC buffer. The PDCP buffer includes a PDCP buffer (priority) 5331 and a PDCP buffer (non-priority) 5332. The buffer control unit 534 includes the packet accumulation unit 5341 and the packet extraction unit 5342. The packet accumulation unit 5341 accumulates received TCP packets in a predetermined buffer of a plurality of PDCP buffers. The packet extraction unit 5342 extracts, depending on priority based on the packet type of the TCP packet, a TCP packet accumulated in a predetermined buffer of the plurality of PDCP buffers and passes the packet over to a lower layer.

More specifically, if the packet determination unit 232 (not illustrated) determines that a received TCP packet is a retransmitted TCP packet, namely, a priority packet, the packet accumulation unit 5341 accumulates the TCP packet in the PDCP buffer (priority) 5331. If the packet determination unit 232 determines that the TCP packet is an initially transmitted TCP packet, namely, a non-priority packet, the packet accumulation unit 5341 accumulates the initially transmitted TCP packet in the PDCP buffer (non-priority) 5332.

Next, the packet extraction unit 5342 determines whether a packet is accumulated in the PDCP buffer (priority) 5331. If a packet is accumulated, the packet extraction unit 5342 preferentially extracts the packet over the packets accumulated in the PDCP buffer (non-priority) 5332 and passes the packet over to a lower RLC layer. In contrast, if no packet is accumulated in the PDCP buffer (priority) 5331, the packet extraction unit 5342 extracts a packet from the PDCP buffer (non-priority) 5332 and passes the packet over to the lower RLC layer.

The packets passed over to the RLC layer are accumulated in the RLC buffer, given radio resources by the scheduler 535 in the order in which the packets are accumulated in the RLC buffer, and transmitted to the wireless terminal(s) 5.

The priority packets and the non-priority packets may be extracted temporally simultaneously from the respective buffers.

Specific Example 2 According to Fifth Exemplary Embodiment

Figure 21:
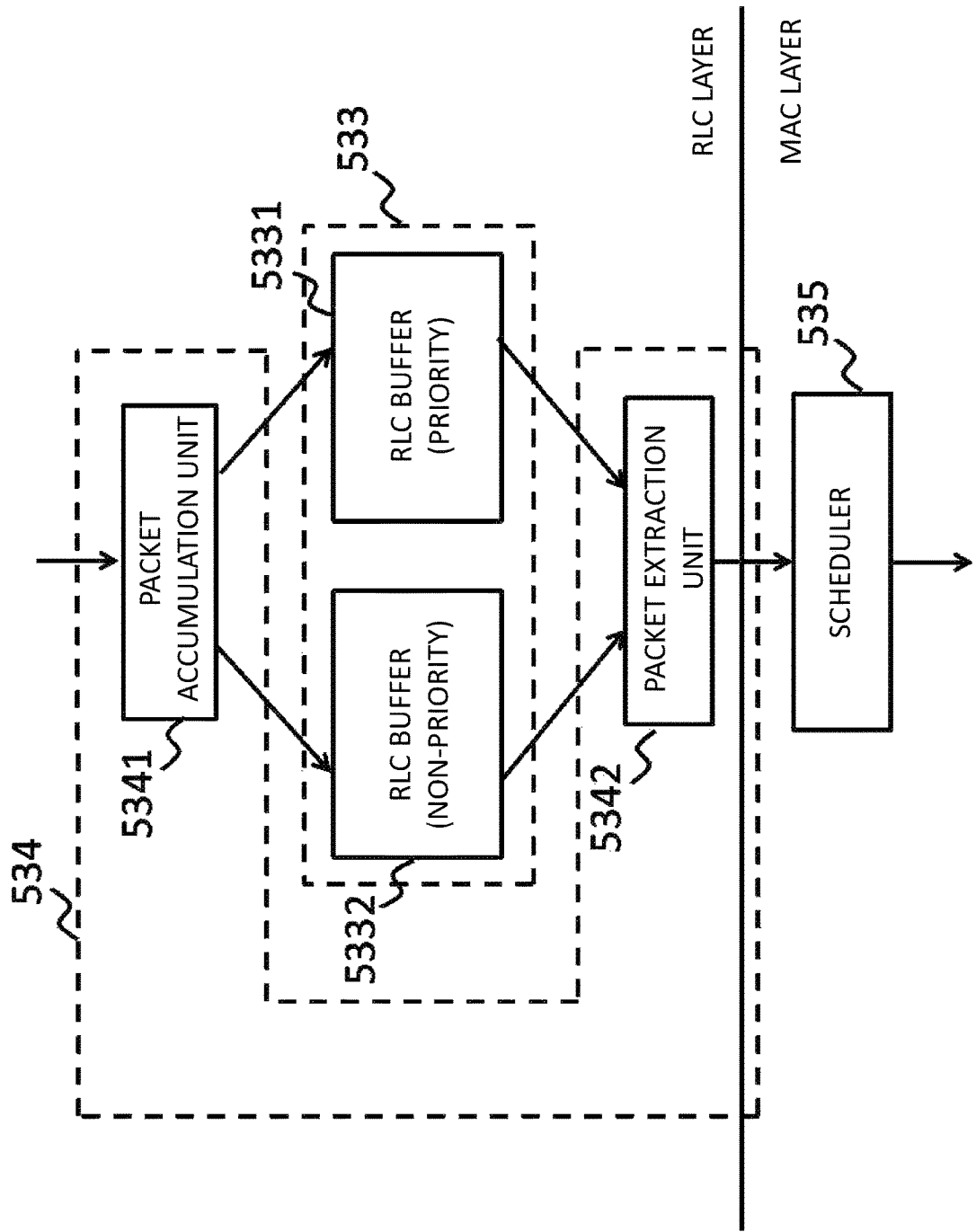
FIG. 21 illustrates specific example 2 of buffer control according to the fifth exemplary embodiment.

FIG. 21 illustrates specific example 2 of the buffer control performed by the buffer control unit 534 according to the present exemplary embodiment. In FIG. 21, the base station buffer 533 includes RLC buffers. The RLC buffers include an RLC buffer (priority) 5331 and an RLC buffer (non-priority) 5332. The buffer control unit 534 includes the packet accumulation unit 5341 and the packet extraction unit 5342. The packet accumulation unit 5341 accumulates received TCP packets in a predetermined buffer of a plurality of RLC buffers. The packet extraction unit 5342 extracts, depending on priority based on the packet type of the TCP packet, a TCP packet accumulated in a predetermined buffer of the plurality of RLC buffers and passes the packet over to a lower layer.

More specifically, if the packet determination unit 232 (not illustrated) determines that a received TCP packet is a retransmitted TCP packet, namely, a priority packet, the packet accumulation unit 5341 accumulates the TCP packet in the RLC buffer (priority) 5331. If the packet determination unit 232 determines that the TCP packet is an initially transmitted TCP packet, namely, a non-priority packet, the packet accumulation unit 5341 accumulates the initially transmitted TCP packet in the RLC buffer (non-priority) 5332.

Next, the packet extraction unit 5342 determines whether a packet is accumulated in the RLC buffer (priority) 5331. If a packet is accumulated, the packet extraction unit 5342 preferentially extracts the packet over the packets accumulated in the RLC buffer (non-priority) 5332 and passes the packet over to a lower MAC (Media Access Control) layer. In contrast, if no packet is accumulated in the RLC buffer (priority) 5331, the packet extraction unit 5342 extracts a packet from the RLC buffer (non-priority) 5332 and passes the packet over to the lower MAC layer.

The packets passed over to the MAC layer are given radio resources by the scheduler 535 in the order in which the packets are extracted from the respective buffer and transmitted to the wireless terminal(s) 5.

As in the above specific example 1, the priority packets and the non-priority packets may be extracted temporally simultaneously from the respective buffers.

Figure 22:
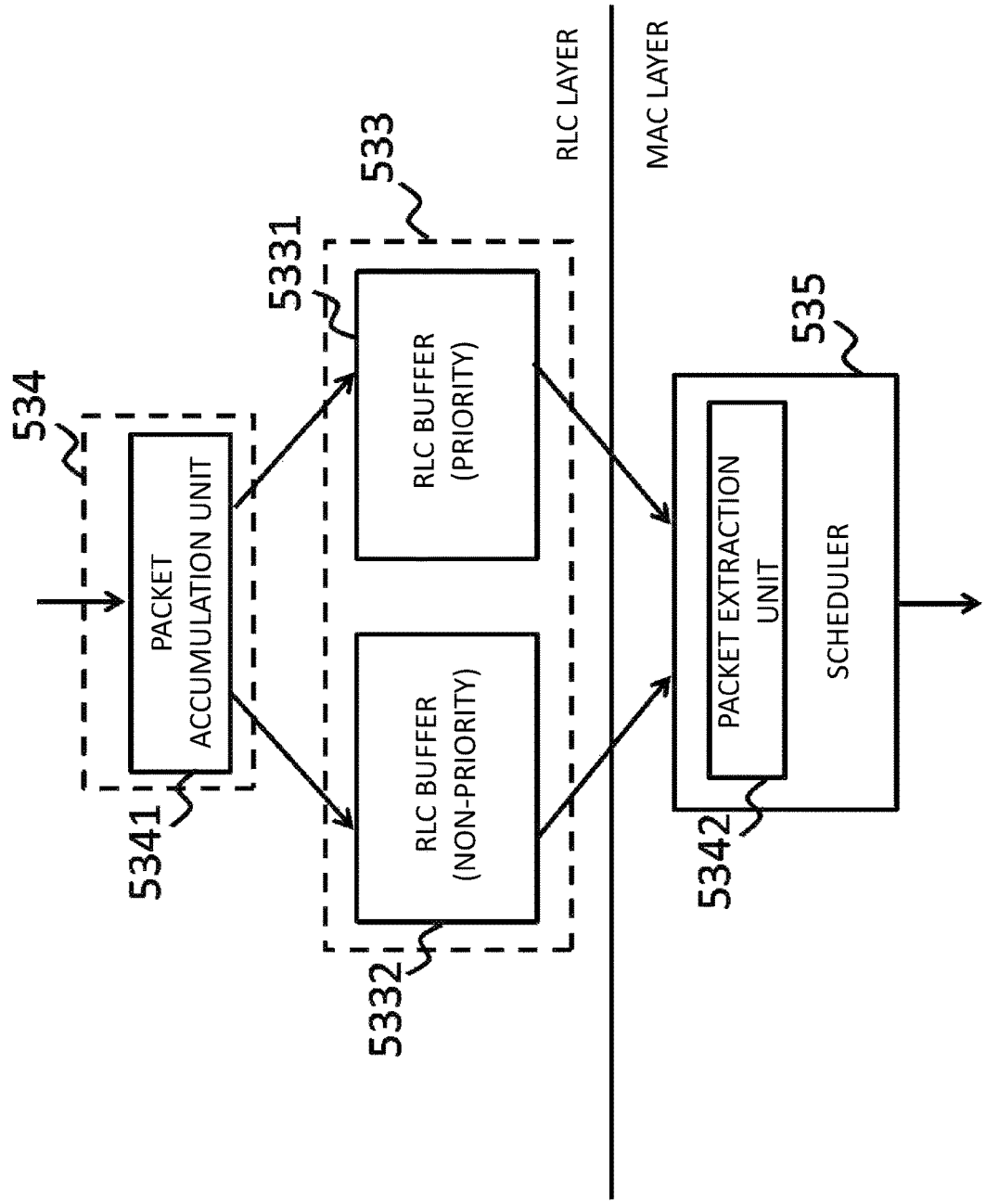
FIG. 22 illustrates a variation of specific example 2 of buffer control according to the fifth exemplary embodiment.

In addition, the function of the packet extraction unit 5342 in specific example 2 may be included in the scheduler 535 as illustrated in FIG. 22.

Specific examples 1 and 2 may be combined with each other.

[Advantageous Effects]

In the present exemplary embodiment, the content transmission apparatus notifies the radio base station of a packet type indicating whether the corresponding TCP packet transmitted to the wireless terminal(s) is a retransmitted packet, and the radio base station performs the buffer control based on the packet type. If the TCP packet is a retransmitted packet, this retransmitted TCP packet is accumulated in a priority buffer and preferentially transmitted from the priority buffer. Thus, transmission delay of the retransmitted TCP packets can be reduced. As a result, deterioration of the QoE of the users of contents using TCP packets can be prevented.

As described above, what type of packet needs to be accumulated in the PDCP buffer (which protocol of packet needs to be accumulated) and the order of the allocation of PDCP SNs and PDCP headers depend on the implementation. For example, packets of an upper layer than PDCP (for example, IP packets) may directly be accumulated in the PDCP buffer. In such case, when these packets are transmitted from the PDCP buffer, these packets are given PDCP SNs and PDCP headers and are next transmitted to a different layer as PDCP packets.

Namely, as in the other exemplary embodiments, the buffer control according to the present exemplary embodiment may be performed on packets (for example, IP packets) in an upper layer than PDCP that are accumulated in the PDCP buffer. In such case, when an upper layer packet is a retransmitted TCP packet, the buffer control may be performed in such a manner that the retransmitted TCP packet is moved to the first position in the PDCP buffer. In addition, a temporary SN may be allocated in the PDCP buffer, and this temporary SN may be used in the buffer control.

Sixth Exemplary Embodiment

A sixth exemplary embodiment of the present invention is applicable to a case in which carrier aggregation is performed by using a cell formed by a main radio base station and a cell formed by an RRH/RRE connected to the main radio base station via a wired network.

[Configuration]

Figure 23:
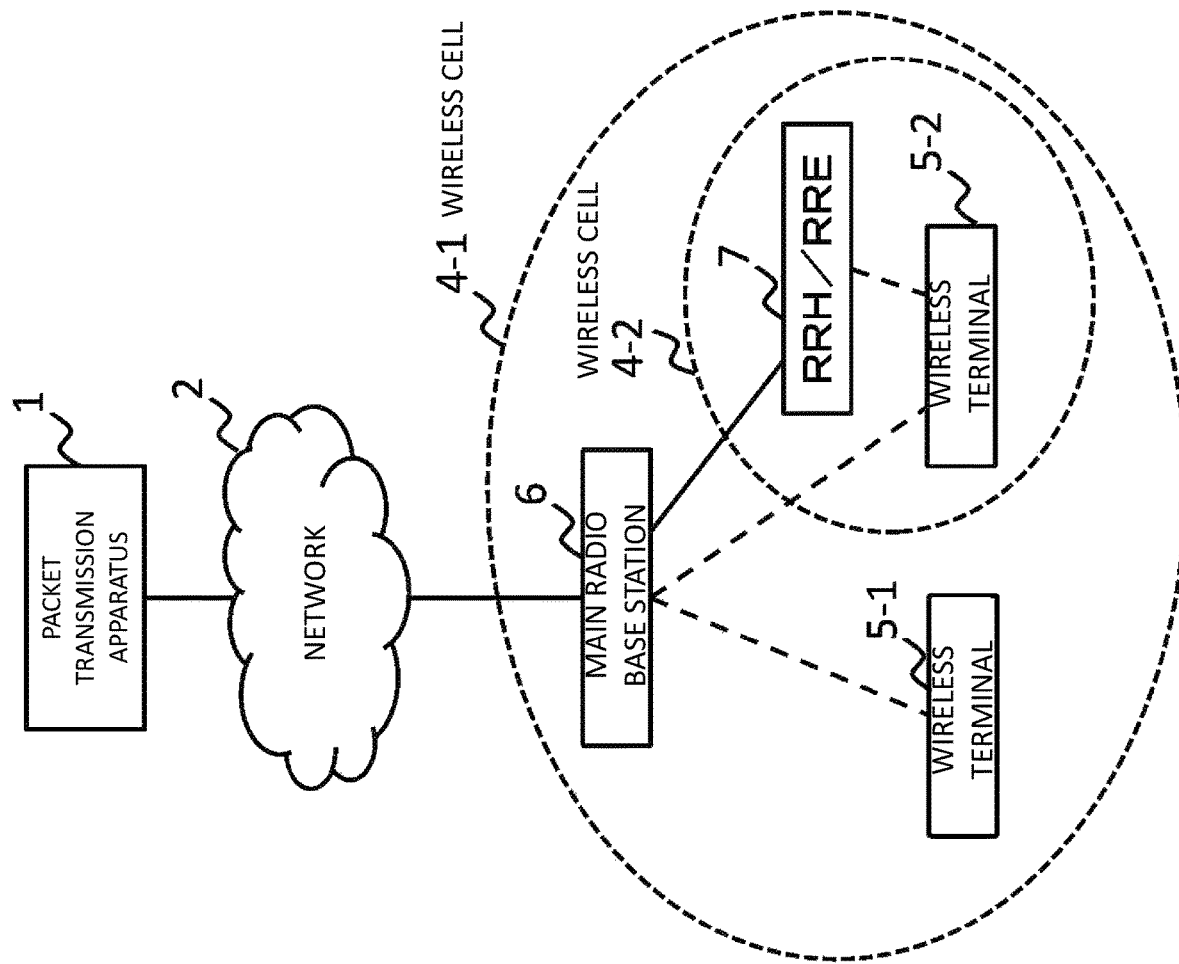
FIG. 23 illustrates a configuration example of a communication system according to a sixth exemplary embodiment.

FIG. 23 illustrates a configuration example of a communication system according to the sixth exemplary embodiment of the present invention. As illustrated in FIG. 23, the present communication system includes a packet transmission apparatus 1, a network 2, wireless cells 4-1 and 4-2, wireless terminals 5-1 and 5-2, a main radio base station 6, an RRH (Radio Remote Head)/RRE (Radio Remote Equipment) 7. The number of components illustrated in FIG. 23 is an example. For example, the present communication system may include a plurality of RRH/RREs 7.

The communication system according to the sixth exemplary embodiment differs from the communication system in FIG. 1 in that the radio base station 3 is removed and that the main radio base station 6, the RRH/RRE 7, and the wireless cell 4-2 are added.

As in the radio base station 3, the main radio base station 6 manages the wireless cell 4-1 and wirelessly transmits packets received from the packet transmission apparatus 1 to the wireless terminal(s) 5 being connected. In addition, the main radio base station 6 manages the wireless cell 4-2 formed by the RRH/RRE 7 via a wired network. The wired network connecting the main radio base station 6 and the RRH/RRE 7 may be an optical fiber, Ethernet (trademark), or the like.

The wireless cell 4-2 is a communication area in which connection with the RRH/RRE 7 can be established. Generally, the cell formed by the RRH/RRE 7 is smaller than the cell formed by the main radio base station as illustrated in FIG. 23. However, the present exemplary embodiment is not limited to such example. The present exemplary embodiment is applicable even when the wireless cells 4-1 and 4-2 are the same size.

The RRH/RRE 7 transmits a signal (including a control signal, user data) received from the main radio base station 6 via a wired communication to the wireless terminal 5-2 that belongs to the wireless cell 4-2. The RRH/RRE 7 can also transmit a signal received from the wireless terminal 5-2 to the main radio base station 6.

The wireless terminal 5-2 belongs to both the wireless cells 4-1 and 4-2. Thus, the wireless terminal 5-2 can communicate with the main radio base station 6 and the RRH/RRE 7. The configuration in which the cell managed by the main radio base station 6 and the cell formed by the RRH/RRE 7 overlaps at least partially is one scenario of Carrier Aggregation (CA). CA is a technique for aggregating two or more component carriers having different frequencies and performing data communication on a single UE (a wireless terminal) simultaneously. In this case, the wireless cell 4-1 corresponds to a P Cell (Primary Cell), and the wireless cell 4-2 corresponds to an S Cell (Secondary Cell).

Figure 24:
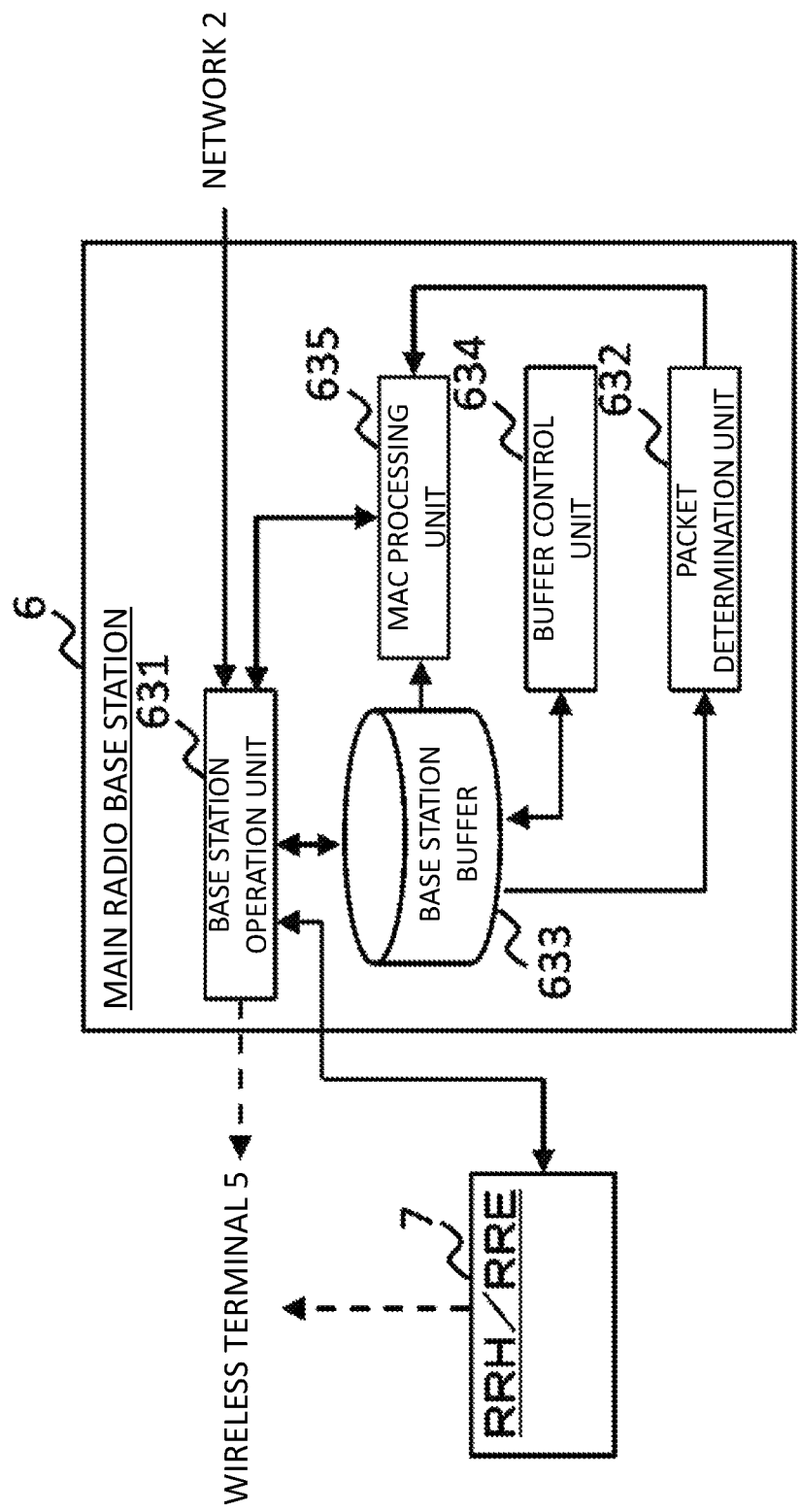
FIG. 24 illustrates a block diagram of configuration examples of a main radio base station and an RRH/RRE according to the sixth exemplary embodiment.

FIG. 24 illustrates a block diagram of configuration examples of the main radio base station 6 and the RRH/RRE 7 according to the present exemplary embodiment.

The main radio base station 6 includes a base station operation unit 631, a packet determination unit 632, a base station buffer 633, a buffer control unit 634, and a MAC processing unit 635.

The base station operation unit 631 includes a function of communicating with the RRH/RRE 7 and managing the cell formed by the RRH/RRE 7, in addition to the functions of the base station operation unit 231 according to the second exemplary embodiment. More specifically, for example, the base station operation unit 631 includes a function of transmitting packets, which need to be transmitted to the wireless terminal 5-2, to the RRH/RRE 7.

The packet determination unit 632 reads and determines the packet type or the packet identifier of an individual TCP packet received from the packet transmission apparatus 1. In the present exemplary embodiment, the packet determination unit 632 uses a DPI function to read the 14th bit of the IP header of a received packet. If the 14th bit is 0, the packet determination unit 632 determines that the received packet is an initially transmitted TCP packet. If the 14th bit is 1, the packet determination unit 632 determines that the received packet is a retransmitted TCP packet. The packet determination unit 632 determines that a retransmitted packet is a priority packet. Next, the packet determination unit 632 notifies the MAC processing unit 635 of information about the priority packet.

Figure 25:
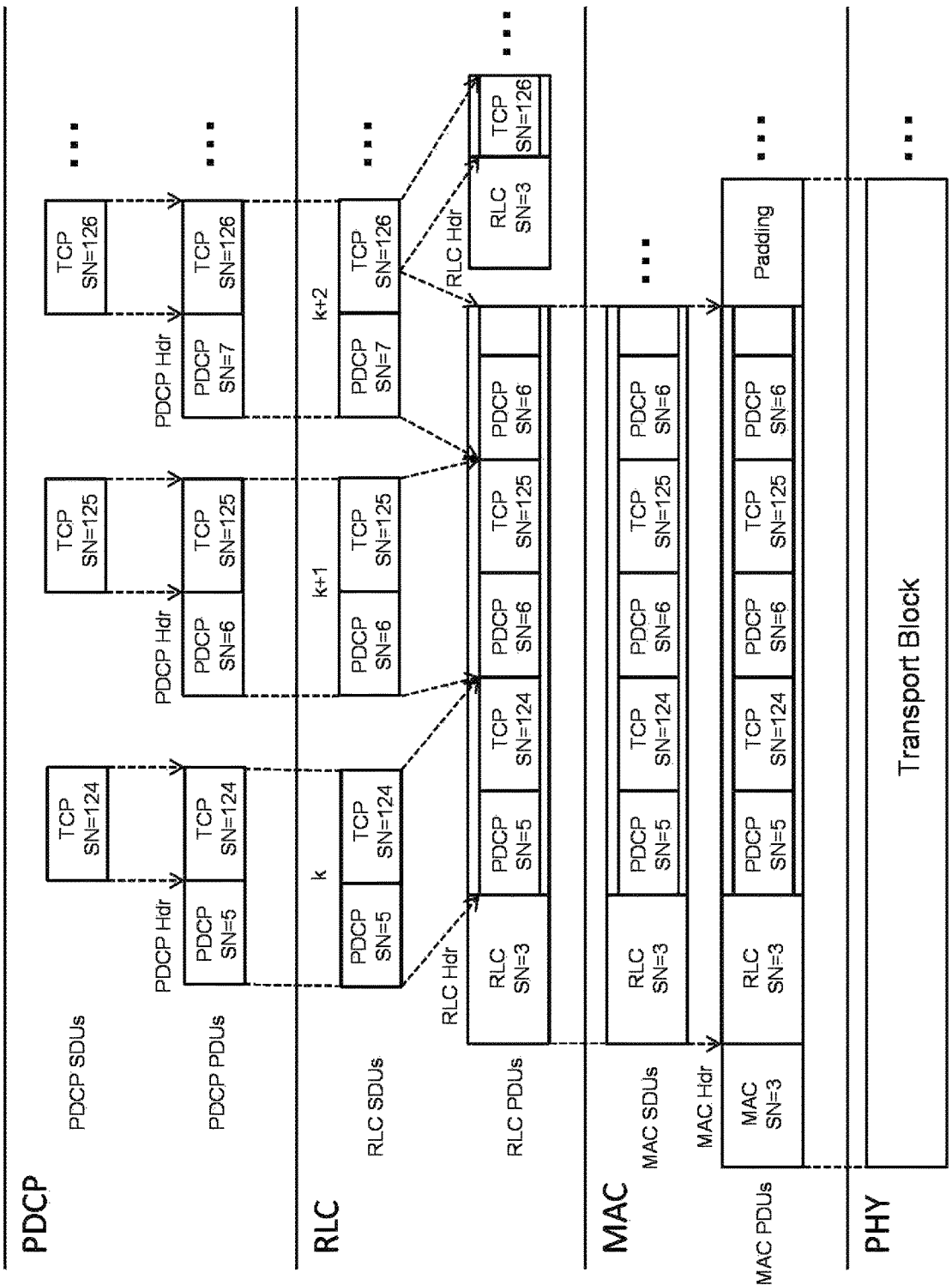
FIG. 25 illustrates a relationship among packet configurations in various layers according to the sixth exemplary embodiment.

The MAC (Media Access Control) processing unit 635 has a function as a scheduler and determines radio resources allocated to the wireless terminals 5. In addition, the MAC processing unit 635 multiplexes MAC SDUs (Service Data Units) and forms MAC PDUs (Packet Data Units) in the MAC (sub) layer and passes the MAC PDUs over to the physical layer (PHY). The MAC PDUs are processed as a Transport Block (TB) in the physical layer (PHY). Hereinafter, a relationship among a configuration of a TB and configurations of RLC (Radio Link Control) and PDCP packets will be described with reference to FIG. 25. A PDCP packet (which can also be referred to as a PDCP PDU) includes a data portion (a PDCP SDU) and a header portion (a PDCP Header (which can be abbreviated as Hdr)). An RLC packet (an RLC PDU) also includes a data portion (an RLC SDU) and a header portion (an RLC Header). The RLC SDU corresponds to a PDCP PDU, namely, a PDCP packet. In addition, at least a part of an RLC SDU (namely, a PDCP packet) is stored in the data portion of an RLC PDU. As illustrated in FIG. 25, a plurality of RLC SDUs may be stored in the data portion of a single RLC packet. A single RLC SDU may be divided into segments, and the segments may be stored in the data portions of a plurality of RLC packets. Thus, in the present exemplary embodiment, when at least a part of a retransmitted TCP packet is included in the data portion of an RLC packet, information indicating that the RLC packet is a priority RLC packet is written in the corresponding RLC header(s). Likewise, when at least a part of a priority RLC packet is included in a MAC PDU, information indicating a priority TB is written in the corresponding MAC header(s).

The MAC processing unit 635 selects the wireless cell 4-1 formed by the main radio base station 6 or the wireless cell 4-2 formed by the RRH/RRE 7 to transmit a TB multiplexed per user TB to the wireless terminal(s) 5. In the present exemplary embodiment, The MAC processing unit 635 determines to transmit a priority TB in which at least a part of a retransmitted TCP packet is included via the RRH/RRE 7.

The buffer control unit 634 controls the base station buffer 233. The buffer control includes accumulating received packets in a buffer and transmitting the packets accumulated in the buffer in the ascending order of the SNs of the packets. The buffer control unit 634 according to the present exemplary embodiment may be a buffer control unit according to another exemplary embodiment.

Since the functions of the base station buffer 633 are the same as those of the base station buffer of the radio base station 3 according to another exemplary embodiment, description thereof will be omitted.

The RRH/RRE 7 may include a BBU (Base Band Unit) and an RRU (Remote Radio Unit) that are not illustrated. The BBU may be included in the main radio base station 6. The BBU is a functional unit that performs signal processing, and the RRU is an RF (Radio Frequency) unit.

[Operation]

Figure 26:
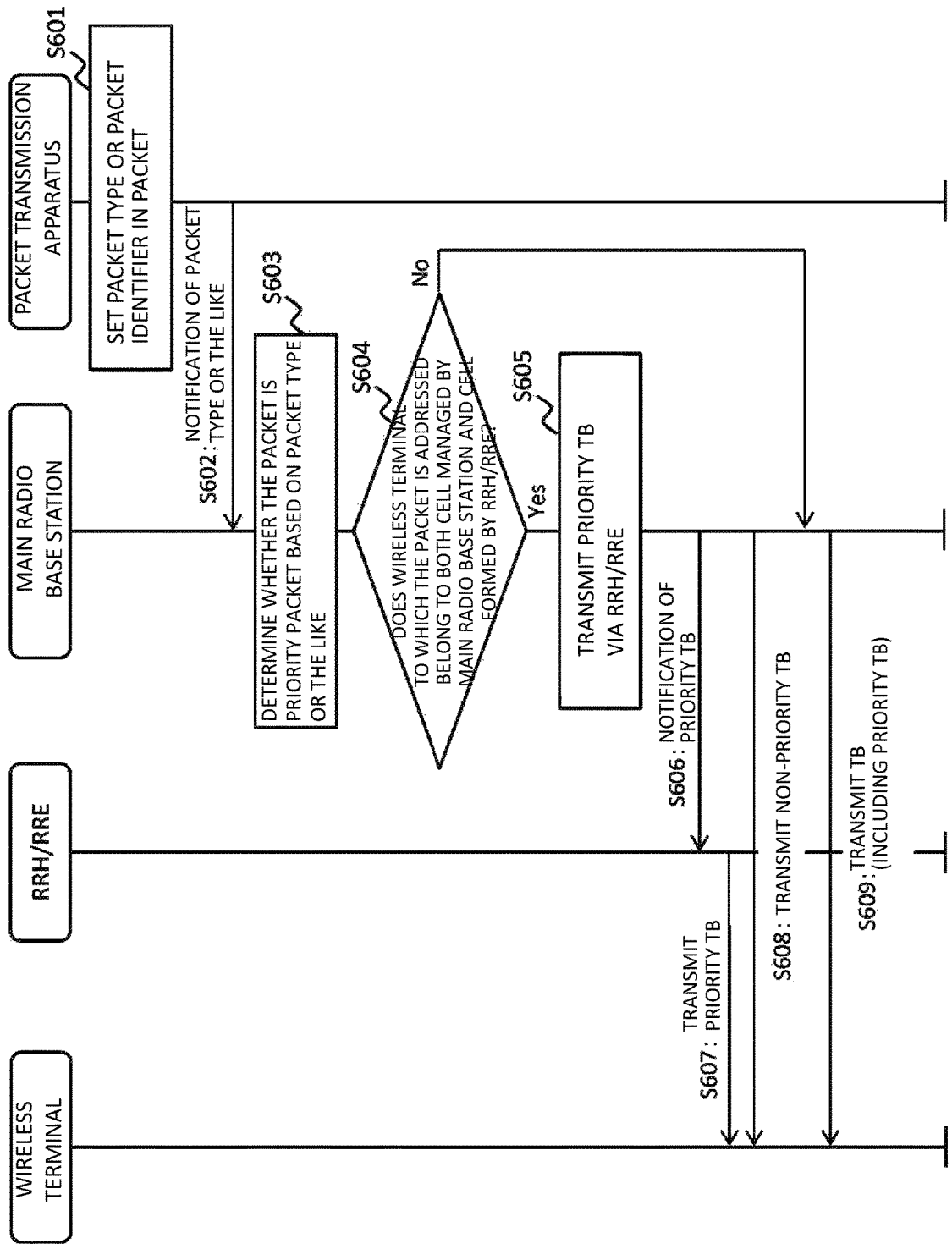
FIG. 26 illustrates a sequence chart of a specific operation example of the communication system according to the sixth exemplary embodiment.

Next, an operation according to the present exemplary embodiment will be described with reference to a sequence chart in FIG. 26. FIG. 26 illustrates a specific operation example of the communication system according to the present exemplary embodiment.

In step S601, the packet transmission apparatus 1 not illustrated in FIG. 24 sets a packet type or a packet identifier in a packet addressed to a wireless terminal 5. More specifically, as in other exemplary embodiments, the packet transmission apparatus 1 divides data addressed to a wireless terminal 5 into TCP packets and sets a packet type or a packet identifier in an unused header area in an IP packet including a corresponding TCP packet. As in other exemplary embodiments, various kinds of information may be used as the packet type or the packet identifier. For example, information indicating whether a TCP packet is an initially transmitted TCP packet or a retransmitted TCP packet may be used. However, the present exemplary embodiment is not limited to such example.

In step S602, the packet transmission apparatus 1 notifies the main radio base station 6 of the packet type or the packet identifier set in an individual packet in step S601 via the network 2. As in other exemplary embodiments, since various methods may be used to notify the main radio base station 6 of the packet type or the packet identifier, description thereof will be omitted.

In step S603, based on the packet type or the packet identifier received from the packet transmission apparatus 1, the main radio base station 6 determines whether the corresponding TCP packet is a priority packet that needs to be preferentially transmitted to the wireless terminal 5. More specifically, the packet determination unit 632 of the main radio base station 6 reads the 14th Bit in the IP header. If the 14th Bit is 0, the packet determination unit 632 determines that the corresponding TCP packet is an initially transmitted TCP packet. If the 14th Bit is 1, the packet determination unit 632 determines that the corresponding TCP packet is a retransmitted TCP packet. The packet determination unit 632 determines that the retransmitted packet is a priority packet.

In step S604, the base station operation unit 631 determines whether the wireless terminal 5 to which the packet is addressed belongs to both the cell 4-1 directly managed by the main radio base station and the cell 4-2 formed by the RRH/RRE 7. In FIG. 23, the wireless terminal 5-2 belongs to both the wireless cells 4-1 and 4-2.

If Yes is determined in step S604, the base station operation unit 631 determines to transmit the priority packet determined in step S603 to the wireless terminal 5-2 via the wireless cell 4-2 formed by the RRH/RRE 7 (step S605). For example, when allocating radio resources for the transmission to the wireless terminal 5, the MAC processing unit 635 determines, from the MAC Header, whether a retransmitted TCP packet is included in the TB (MAC frame) addressed to the wireless terminal 5-2 and determines to transmit the TB (priority TB) in which at least a retransmitted TCP packet is partially included to the wireless terminal 5-2 via the wireless cell 4-2 formed by the RRH/RRE 7.

In step S606, the main radio base station 6 notifies the RRH/RRE of the priority TB. More specifically, in accordance with an instruction from the MAC processing unit 635, the base station operation unit 631 notifies the RRH/RRE 7 of the priority packet.

Next, in step S607, the RRH/RRE 7 transmits the priority packet to the wireless terminal 5-2.

In step S608, the main radio base station 6 transmits a TB including a packet (non-priority packet) that has not been determined to be a priority packet by the packet determination unit 632 to the wireless terminal 5-2.

In step S604, if the main radio base station 6 determines that the wireless terminal 5 to which the packet is addressed does not belong to both the cell 4-1 directly managed by the main radio base station and the cell 4-2 formed by the RRH/RRE 7, for example, if the wireless terminal 5-1 belongs only to the wireless cell 4-1 managed by the main radio base station 6 (step S604 No), in step S609 the main radio base station 6 transmits the packet including a priority packet addressed to the wireless terminal 5-1.

Examples of the packets transmitted from the RRH/RRE 7 to the wireless terminal 5-2 include not only priority packets but also non-priority packets (for example, initially transmitted TCP packets). The priority packets (for example, retransmitted TCP packets) may be transmitted from the main radio base station 6, and the non-priority packet may be transmitted from the RRH/RRE 7.

In addition, while the present exemplary embodiment has been described by using a configuration including the main radio base station 6 and the RRH/RRE 7, the present exemplary embodiment is not limited to such example. The present exemplary embodiment is applicable to any configuration to which CA can be applied. For example, the configuration of the main radio base station 6 and the RRH/RRE 7 may be applied to a configuration of a single macro base station that manages a plurality of cells, to a configuration of a heterogeneous network in which a macro base station and a femtocell base station exist, or a homogeneous network in which only macro base stations exist.

[Advantageous Effects]

When the number of wireless terminals 5 that belong to the wireless cell 4-1 formed by the main radio base station 6 is different from the number of wireless terminals 5 that belong to the wireless cell 4-2 formed by the RRH/RRE 7, since priority packets (retransmitted TCP packets) can be transmitted from the wireless cell to which fewer wireless terminals 5 belong (for example, from the wireless cell 4-2 formed by the RRH/RRE 7), deterioration of the QoE of the users of contents using TCP packets can be prevented.

Other Exemplary Embodiments

While several exemplary embodiments of the present invention have thus been described, the present invention is not limited thereto.

In the second exemplary embodiment, while the operation illustrated by the flowchart in FIG. 12 is performed each time a TCP packet arrives at the radio base station 23 and is newly accumulated in the base station buffer 202, a condition may be added for the implementation of the operation. For example, this is because, when the load on the radio base station 23 increases, the probability of the occurrence of the deterioration of the QoE changes depending on the level of the load. For example, if the number of PDCP packets accumulated in a PDCP buffer is used as the load, depending on the level of the load, namely, depending on the number (accumulated amount) of the packets in a buffer of the radio base station, the time needed for a packet to arrive at a wireless terminal (packet delay time) changes. Namely, when the packet delay time is extended, deterioration of the QoE is expected. As another example of the load, the PRB Usage, which is the frequency block allocation unit of the radio base station 23, may be used. For example, a condition that the buffer control is performed if the PRB Usage exceeds a predetermined value (for example: 50%) may be added. As another example of the implementation condition, the content transmission apparatus 21 may measure an application QoE, and when the QoE deteriorates, the content transmission apparatus 21 may notify the radio base station 23 of the deterioration. In this case, the operation is performed when the radio base station 23 is notified of the deterioration. In addition, the radio base station 23 may perform its operation when the radio quality between the radio base station 23 and a wireless terminal 5 represents predetermined quality. While a CQI is an example of the radio quality, the present invention is not limited to such example. For example, when the radio quality reaches a predetermined threshold or less, the radio quality may be determined to have reached the predetermined quality. This implementation condition is effective because, when the radio quality between the radio base station 23 and the wireless terminal 5 is a predetermined threshold or less, the efficiency of the packet transmission from the radio base station 23 to the wireless terminal 5 deteriorates and the application QoE also deteriorates.

The above radio base stations, packet transmission apparatuses, wireless terminals may be realized by hardware, software, or a combination thereof. In addition, methods of controlling the above radio base stations, packet transmission apparatuses, and wireless terminals may also be realized by hardware, software, or a combination thereof. Realizing the above components and methods with software means causing a computer(s) to read and execute a program(s).

The program(s) can be stored in various types of non-transitory computer readable medium and supplied to the computer(s). Examples of the non-transitory computer readable medium include various types of tangible storage medium.

Examples of the non-transitory computer readable medium include a magnetic recording medium (for example, a flexible disk, a magnetic tape, and a hard disk drive), a magneto-optical recording medium (for example, a magneto-optical disc), a CD-ROM (Compact Disc-Read Only Memory), a CD-R, a CD-R/W, a DVD-ROM (Digital Versatile Disc-ROM), a DVD-R, a DVD-R/W, and a semiconductor memory (for example, a mask ROM, a PROM (Programmable ROM), an EPROM (Erasable PROM), a flash ROM, and a RAM (Random Access Memory)). In addition, the program(s) can also be stored in various types of transitory computer readable medium and supplied to the computer(s). Examples of the transitory computer readable medium include an electrical signal, an optical signal, and electromagnetic wave. The transitory computer readable medium can supply the program(s) to the computer(s) through a wired communication path such as an electrical wire or an optical fiber or through a wireless communication path.

While several exemplary embodiments of the present invention have thus been described, the present invention is not limited to the above exemplary embodiments. Various modifications or combinations can of course be made without departing from the above-described gist of the present invention.

In addition, the above exemplary embodiments can partially or entirely be described, but not limited to, as follows.
(Note 1)
A radio base station that receives a packet(s) transmitted from a packet transmission apparatus via a network and transmits the received packet(s) to a wireless terminal(s), the radio base station comprising:
acquisition means that acquires a packet type(s) or a packet identifier(s) set in the packet(s) by the packet transmission apparatus; and
control means that performs transmission control to move forward a transmission order of a predetermined packet(s) based on the packet type(s) or the packet identifier(s).

(Note 2)
The radio base station according to note 1,
wherein the packet type(s) or the packet identifier(s) is a packet type(s) or a packet identifier(s) in a first layer, and
wherein the control means performs transmission control in a second layer lower than the first layer based on the packet type(s) or the packet identifier(s) in the first layer.
(Note 3)
The radio base station according to note 1 or 2,
wherein the packet transmission apparatus is a content transmission apparatus that delivers a content(s) to a wireless terminal(s), and wherein the packet(s) is obtained by the content transmission apparatus dividing data of the content(s).
(Note 4)
The radio base station according to any one of notes 1 to 3, wherein the packet type(s) indicates whether the packet(s) is a retransmitted packet(s).
(Note 5)
The radio base station according to any one of notes 1 to 3, wherein the packet identifier(s) is a TCP packet identification number(s).
(Note 6)
The radio base station according to any one of notes 1 to 3, wherein the packet type(s) indicates whether the packet(s) is prefetched data.
(Note 7) (Control of Transmission Buffer: Change of SN)
The radio base station according to any one of notes 1 to 6,
wherein the radio base station further includes a buffer for accumulating the packet(s), and
wherein, in the transmission control, a buffering order of the predetermined packet(s) is changed depending on a packet transmission priority(ies) determined based on the packet type(s) or the packet identifier(s).
(Note 8) (Control of Transmission Buffer: Preparation of Priority Buffer)
The radio base station according to any one of notes 1 to 6,
wherein the radio base station further includes a plurality of buffers having different priorities for accumulating the packet(s), and
wherein, in the transmission control, the predetermined packet(s) is buffered in a buffer of a predetermined priority depending on a packet transmission priority(ies) determined based on the packet type(s) or the packet identifier(s).
(Note 9)
The radio base station according to any one of notes 1 to 8, wherein the packet type(s) or the packet identifier(s) is set in a packet header(s) transmitted from the packet transmission apparatus.
(Note 10)
The radio base station according to any one of notes 1 to 8,
wherein the packet type(s) or the packet identifier(s) is set in a packet(s) different from the packet(s) transmitted from the packet transmission apparatus, and
wherein the acquisition means acquires the packet type(s) or the packet identifier(s) from the different packet(s) received from the packet transmission apparatus.
(Note 11)
The radio base station according to any one of notes 1 to 10, wherein the transmission control is performed each time the packet(s) arrives at the radio base station.
(Note 12)
The radio base station according to any one of notes 7 to 10, wherein the transmission control is started when at least one of the total number of and the total size of packets buffered in the buffer satisfies a predetermined condition(s).

(Note 13)

The radio base station according to any one of notes 1 to 10, wherein the transmission control is started when load on the radio base station satisfies a predetermined condition(s).

(Note 14)

The radio base station according to any one of notes 1 to 10, wherein the transmission control is started when the radio base station is notified of deterioration of QoE (Quality of Experience) by the packet transmission apparatus.

(Note 15)

The radio base station according to any one of notes 1 to 10, wherein the transmission control is started when radio quality between the radio base station and the wireless terminal(s) is equal to predetermined quality.

(Note 16) Packet Transmission Apparatus (Content Transmission Apparatus, Content Server)

A packet transmission apparatus that transmits a packet(s) addressed to a wireless terminal(s) to a radio base station via a network, the packet transmission apparatus comprising:
setting means that sets a packet type(s) or a packet identifier(s) in the packet(s); and
transmission means that transmits a packet(s) in which the packet type(s) or the packet identifier(s) is set to a radio base station that performs transmission control to move forward a transmission order of a predetermined packet(s) based on the packet type(s) or the packet identifier(s).

(Note 17)

A method of controlling a radio base station that receives a packet(s) transmitted from a packet transmission apparatus via a network and transmits the received packet(s) to a wireless terminal(s), the method comprising:
acquiring a packet type(s) or a packet identifier(s) set in the packet(s) by the packet transmission apparatus from the packet transmission apparatus; and
performing transmission control to move forward a transmission order of a predetermined packet(s) based on the packet type(s) or the packet identifier(s).

(Note 18)

A program, causing a computer to perform a method of controlling a radio base station that receives a packet(s) transmitted from a packet transmission apparatus via a network and transmits the received packet(s) to a wireless terminal(s), the program performing processing for:
acquiring a packet type(s) or a packet identifier(s) set in the packet(s) by the packet transmission apparatus from the packet transmission apparatus; and
performing transmission control to move forward a transmission order of a predetermined packet(s) based on the packet type(s) or the packet identifier(s).

(Note 19)

A wireless terminal, receiving a packet(s) from a radio base station that has received the packet(s) from a packet transmission apparatus, the wireless terminal comprising:
reception means that receives the packet(s) from the radio base station that performs transmission control to move forward a transmission order of a predetermined packet(s) based on a packet type(s) or a packet identifier(s) set in the packet(s) by the packet transmission apparatus; and
data configuration means that reconfigures data transmitted from the packet transmission apparatus from the packet(s).

REFERENCE SIGNS LIST

1 packet transmission apparatus
2 network
3, 23, 33, 43, 53 radio base station
4, 4-1, 4-2 wireless cell
5, 5-1, 5-2 wireless terminal
101, 1011, 1012 PDCP packet
102, 1021, 1022 TCP packet
110 packet type setting unit
111 packet transmission unit
131 packet transmission and reception unit
132 transmission control unit
151 packet reception unit
152 data configuration unit
21, 41 content transmission apparatus
211, 411 content transmission unit
212 content accumulation unit
231, 331, 531 base station operation unit
232, 332, 432 packet determination unit
233, 333, 533 base station buffer
234, 534 buffer control unit
235, 535 scheduler
31 relay apparatus
311 packet transmission and reception unit
312 relay apparatus buffer
5341 packet accumulation unit
5342 packet acquisition unit
5331 PDCP buffer (priority), RLC buffer (priority)
5332 PDCP buffer (non-priority), RLC buffer (non-priority)
6 main radio base station
7 RRH (Radio Remote Head)/RRE (Radio Remote Equipment)
631 base station operation unit
632 packet determination unit
633 base station buffer
634 buffer control unit
635 MAC processing unit

What is claimed is:

1. A radio base station that receives a packet(s) transmitted from a packet transmission apparatus via a network and transmits the received packet(s) to a wireless terminal(s), the radio base station comprising:
    an acquisition unit implemented at least by hardware and that acquires a packet type(s) or a packet identifier(s) set in the packet(s) by the packet transmission apparatus; and
    a control unit implemented at least by the hardware and that performs transmission control to change a transmission order of the packet(s) based on the packet type(s) or the packet identifier(s),
    wherein the packet type(s) or the packet identifier(s) is a packet type(s) or a packet identifier(s) in a first layer, the packet identifier(s) comprising a sequence number allocated for identification of a corresponding packet, and the packet type comprising information whether the corresponding packet is an initially transmitted TCP packet or not,
    wherein the control unit performs transmission control in a second layer lower than the first layer based on the packet type(s) or the packet identifier(s) in the first layer.

2. The radio base station according to claim 1, wherein, when the packet type is a retransmitted packet, the control unit moves forward the transmission order of the packet(s).

3. The radio base station according to claim 1, comprising:
    a buffer for accumulating the packet(s), and
    wherein the control unit changes a buffering order of the packet(s) depending on a packet transmission priority(ies) determined based on the packet type(s) or the packet identifier(s).

4. The radio base station according to claim 1, comprising:
   a plurality of buffers having different priorities for accumulating the packets, and
   wherein the control buffers the packet(s) in a buffer of a corresponding priority depending on a packet transmission priority(ies) determined based on the packet type(s) or the packet identifier(s).

5. The radio base station according to claim 1, wherein the packet type(s) or the packet identifier(s) is set in a packet header transmitted from the packet transmission apparatus.

6. The radio base station according to claim 3, wherein the control unit starts the transmission control when at least one of a total number of and a total size of the buffered packets satisfies a predetermined condition(s).

7. A method of controlling a radio base station that receives a packet(s) transmitted from a packet transmission apparatus via a network and transmits the received packet(s) to a wireless terminal(s), the method comprising:
   acquiring a packet type(s) or a packet identifier(s) set in the packet(s) by the packet transmission apparatus from the packet(s); and
   performing transmission control to change a transmission order of the packet(s) based on the packet type(s) or the packet identifier(s),
   wherein the packet type(s) or the packet identifier(s) is a packet type(s) or a packet identifier(s) in a first layer, the packet identifier(s) comprising a sequence number allocated for identification of a corresponding packet, and the packet type comprising information whether the corresponding packet is an initially transmitted TCP packet or not,
   wherein the transmission control is performed in a second layer lower than the first layer based on the packet type(s) or the packet identifier(s) in the first layer.

8. A program, recorded on a computer-readable non-transient recording medium, the program causing a computer to perform a method of controlling a radio base station that receives a packet(s) transmitted from a packet transmission apparatus via a network and transmits the received packet(s) to a wireless terminal(s), the program causing the computer to perform processing of:
   acquiring a packet type(s) or a packet identifier(s) set in the packet(s) by the packet transmission apparatus from the packet(s); and
   performing transmission control to change a transmission order of the packet(s) based on the packet type(s) or the packet identifier(s),
   wherein the packet type(s) or the packet identifier(s) is a packet type(s) or a packet identifier(s) in a first layer, the packet identifier(s) comprising a sequence number allocated for identification of a corresponding packet, and the packet type comprising information whether the corresponding packet is an initially transmitted TCP packet or not,
   wherein the transmission control is performed in a second layer lower than the first layer based on the packet type(s) or the packet identifier(s) in the first layer.

9. A wireless terminal, receiving a packet(s) from a radio base station that has received the packet(s) from a packet transmission apparatus, the wireless terminal comprising:
   a reception unit implemented at least by hardware that receives the packet(s) from the radio base station that performs transmission control to change a transmission order of the packet(s) based on a packet type(s) or a packet identifier(s) set in the packet(s) by the packet transmission apparatus; and
   a data configuration implemented at least by the hardware and that reconfigures data transmitted from the packet transmission apparatus from the packet(s),
   wherein the packet type(s) or the packet identifier(s) is a packet type(s) or a packet identifier(s) in a first layer, the packet identifier(s) comprising a sequence number allocated for identification of a corresponding packet, and the packet type comprising information whether the corresponding packet is an initially transmitted TCP packet or not,
   wherein the transmission control is performed in a second layer lower than the first layer based on the packet type(s) or the packet identifier(s) in the first layer.

10. The radio base station according to claim 1, wherein, when the second layer is a layer of PDCP.

* * * * *